US011395718B2

(12) United States Patent
Raby et al.

(10) Patent No.: US 11,395,718 B2
(45) Date of Patent: Jul. 26, 2022

(54) REMOVABLE DENTAL APPLIANCE INCLUDING JUMPERS

(71) Applicant: 3M INNOVATIVE PROPERTIES COMPANY, St. Paul, MN (US)

(72) Inventors: Richard E. Raby, Lino Lakes, MN (US); Chaodi Li, Woodbury, MN (US); Michael K. Domroese, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 5 days.

(21) Appl. No.: 16/753,677

(22) PCT Filed: Sep. 18, 2018

(86) PCT No.: PCT/IB2018/057170
§ 371 (c)(1),
(2) Date: Apr. 3, 2020

(87) PCT Pub. No.: WO2019/069164
PCT Pub. Date: Apr. 11, 2019

(65) Prior Publication Data
US 2020/0253695 A1  Aug. 13, 2020

Related U.S. Application Data

(60) Provisional application No. 62/569,144, filed on Oct. 6, 2017.

(51) Int. Cl.
*A61C 7/08* (2006.01)
*A61C 7/00* (2006.01)

(52) U.S. Cl.
CPC ............... *A61C 7/08* (2013.01); *A61C 7/002* (2013.01)

(58) Field of Classification Search
CPC .. A61C 7/002; A61C 7/08; A61C 7/22; A61C 7/02; A61C 7/20; A61C 7/148;
(Continued)

(56) References Cited

U.S. PATENT DOCUMENTS 5,312,247 A    5/1994  Sachdeva
5,964,589 A *  10/1999 Musich .................... A61C 7/20
                                                433/20

(Continued)

FOREIGN PATENT DOCUMENTS

CN    202589687 U    12/2012
JP    2003038520     2/2003

(Continued)

OTHER PUBLICATIONS

International Search Report for PCT International Application No. PCT/IB2018/057170, dated Jan. 18, 2019, 4 pages.

*Primary Examiner* — Heidi M Eide
*Assistant Examiner* — Drew S Folgmann
(74) *Attorney, Agent, or Firm* — 3M IPC

(57) ABSTRACT

A removable dental appliance that includes an appliance body configured to at least partially surround a plurality of teeth of a dental arch of a patient. The appliance body including a first and second shell shaped to receive a first and second respective tooth; and at least one jumper including an elongated structure having a first end coupled to the first shell and a second end coupled to the second shell. The at least one jumper is configured to apply a force between the first and second shells to cause a movement of at least one of the first and second teeth toward a desired position when the removable dental appliance is worn by the patient.

15 Claims, 16 Drawing Sheets

(58) Field of Classification Search
CPC ....... A61C 2007/004; A61C 7/10; A61C 7/14; A61C 9/0053
USPC ...................................................... 433/6, 24
See application file for complete search history.

(56) References Cited

U.S. PATENT DOCUMENTS

| | | | |
|---|---|---|---|
| 6,572,372 | B1 | 6/2003 | Phan |
| 6,845,175 | B2 | 1/2005 | Kopelman |
| 7,011,518 | B2 | 3/2006 | DeLuke |
| 7,027,642 | B2 | 4/2006 | Rubbert |
| 7,234,937 | B2 | 6/2007 | Sachdeva |
| 7,731,495 | B2 | 6/2010 | Eisenberg |
| 8,194,067 | B2 | 6/2012 | Raby |
| 8,491,306 | B2 | 7/2013 | Raby |
| 8,651,857 | B2 | 2/2014 | Geenty |
| 8,738,165 | B2 | 5/2014 | Cinader, Jr |
| 9,345,557 | B2 | 5/2016 | Anderson |
| 9,532,854 | B2 | 1/2017 | Cinader, Jr |
| 2004/0009449 | A1 | 1/2004 | Mah |
| 2004/0029068 | A1 | 2/2004 | Sachdeva |
| 2006/0093983 | A1 | 5/2006 | Schultz |
| 2007/0031791 | A1 | 2/2007 | Cinader, Jr. |
| 2007/0065768 | A1 | 3/2007 | Nadav |
| 2008/0020337 | A1 | 1/2008 | Phan |
| 2008/0160475 | A1* | 7/2008 | Rojas-Pardini .......... A61C 7/00 433/24 |
| 2009/0098500 | A1 | 4/2009 | Diaz Rendon |
| 2009/0148803 | A1 | 6/2009 | Kuo |
| 2010/0279245 | A1* | 11/2010 | Navarro .................. A61C 7/08 433/6 |
| 2013/0325431 | A1 | 12/2013 | See |
| 2014/0363779 | A1 | 12/2014 | Iman |
| 2015/0140501 | A1 | 5/2015 | Kim |
| 2015/0157421 | A1* | 6/2015 | Martz ...................... A61C 7/08 433/6 |
| 2015/0216627 | A1 | 8/2015 | Kopelman |
| 2015/0257856 | A1* | 9/2015 | Martz ...................... A61C 7/08 433/6 |
| 2015/0265376 | A1* | 9/2015 | Kopelman ............... A61C 7/08 433/6 |
| 2016/0067014 | A1 | 3/2016 | Kottemann |
| 2016/0128803 | A1 | 5/2016 | Webber et al. |
| 2016/0193014 | A1 | 7/2016 | Morton |
| 2016/0310236 | A1 | 10/2016 | Kopelman |
| 2017/0007366 | A1 | 1/2017 | Kopelman |
| 2017/0065373 | A1 | 3/2017 | Martz |

FOREIGN PATENT DOCUMENTS

| | | |
|---|---|---|
| JP | 2011212132 | 10/2011 |
| KR | 200465679 | 3/2013 |
| KR | 1020150119597 | 10/2015 |
| KR | 1020170071155 | 6/2017 |
| WO | WO 2006-096558 | 9/2006 |
| WO | WO 2007-084727 | 7/2007 |
| WO | WO 2014-128423 | 8/2014 |
| WO | WO 2015-114450 | 8/2015 |
| WO | WO 2015-140614 | 9/2015 |
| WO | WO 2019-023166 | 1/2019 |
| WO | WO 2019-069162 | 4/2019 |
| WO | WO 2019-069163 | 4/2019 |
| WO | WO 2019-069165 | 4/2019 |
| WO | WO 2019-069166 | 4/2019 |
| WO | WO 2019-069268 | 4/2019 |

* cited by examiner

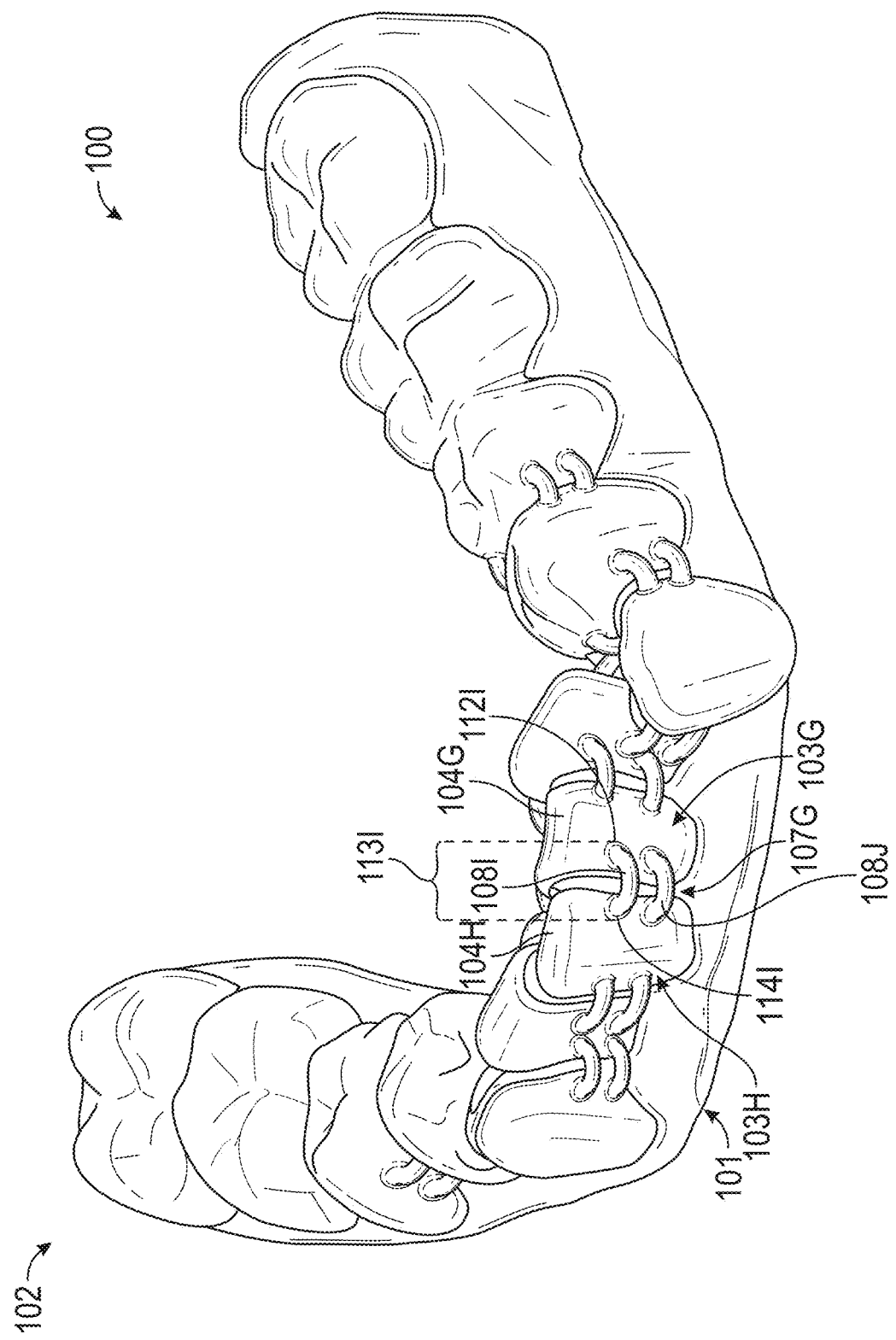

REMOVABLE DENTAL APPLIANCE INCLUDING JUMPERS

CROSS REFERENCE TO RELATED APPLICATIONS

This application is a national stage filing under 35 U.S.C. 371 of PCT/IB2018/057170, filed Sep. 18, 2018, which claims the benefit of provisional Application No. 62/569,144, filed Oct. 6, 2017, the disclosure of which is incorporated by reference in its/their entirety herein.

TECHNICAL FIELD

This disclosure relates to polymer-based removable dental appliances such as tooth aligners.

BACKGROUND

The field of orthodontics relates to repositioning a patient's teeth for improved function and aesthetic appearance. Orthodontic devices and treatment methods generally involve the application of forces to move teeth into a proper bite configuration, or occlusion. As one example, orthodontic treatment may involve the use of slotted appliances, known as brackets, which are fixed to the patient's anterior, cuspid, and bicuspid teeth. An archwire is typically placed in the slot of each bracket and serves as a track to guide movement of the teeth to desired orientations. The ends of the archwire are usually received in appliances known as buccal tubes that are secured to the patient's molar teeth. Such dental appliances remain in the mouth of the patient and are periodically adjusted by an orthodontist to check the process and maintain the proper force levels on the teeth until proper alignment is achieved.

Orthodontic treatment may also involve the use of alignment trays, such as, clear or transparent, polymer-based tooth positioning trays, often referred to as clear tray aligners (CTAs). For example, orthodontic treatment with CTAs may include forming a tray having shells that couple one or more teeth. Each shell may be deformed from an initial position of a tooth, e.g., a maloccluded position. The deformed position of a respective shell of the CTA may apply a force to a respective tooth toward a desired position for the tooth that is an intermediate position between the initial position and a final position resulting from the orthodontic treatment.

SUMMARY

In some examples, the disclosure describes a removable dental appliance including an appliance body configured to at least partially surround a plurality of teeth of a dental arch of a patient. The appliance body includes a first shell shaped to receive a first tooth of the plurality of teeth; a second shell shaped to receive a second tooth of the plurality of teeth; and an at least one jumper comprising an elongated structure having a first end and a second end. The first end of the at least one jumper is coupled to the first shell and the second end of the at least one jumper is coupled to the second shell. The at least one jumper is configured to apply a force between the first and second shells to cause a movement of at least one of the first and second teeth toward a desired position when the removable dental appliance is worn by the patient.

In some examples, the disclosure describes a system that includes an ordered set of removable dental appliances configured to reposition one or more teeth of a patient. Each removable dental appliance in the set of removable dental appliances includes an appliance body configured to at least partially surround a plurality of teeth of a dental arch of a patient. The appliance body includes a first shell shaped to receive a first tooth of the plurality of teeth; a second shell shaped to receive a second tooth of the plurality of teeth; and an at least one jumper comprising an elongated structure having a first end and a second end. The first end of the at least one jumper is coupled to the first shell and the second end of the at least one jumper is coupled to the second shell. The at least one jumper is configured to apply a force between the first and second shells to cause a movement of at least one of the first and second teeth toward a desired position when the removable dental appliance is worn by the patient.

In some examples, the disclosure describes a method that includes forming a model of dental anatomy of a patient; and forming, based on the model, a removable dental appliance. The removable dental appliance includes an appliance body configured to at least partially surround a plurality of teeth of a dental arch of a patient. The appliance body includes a first shell shaped to receive a first tooth of the plurality of teeth; a second shell shaped to receive a second tooth of the plurality of teeth; and an at least one jumper comprising an elongated structure having a first end and a second end. The first end of the at least one jumper is coupled to the first shell and the second end of the at least one jumper is coupled to the second shell. The at least one jumper is configured to apply a force between the first and second shells to cause a movement of at least one of the first and second teeth toward a desired position when the removable dental appliance is worn by the patient.

In some examples, the disclosure describes a method that includes receiving, by a computing device, a digital representation of a three-dimensional (3D) dental anatomy of a patient. The dental anatomy includes initial positions of one or more teeth of the patient. The method includes determining, by the computing device, dimensions and shapes of a removable dental appliance for the patient. The removable dental appliance includes an appliance body configured to at least partially surround a plurality of teeth of a dental arch of the patient. The dimensions and shapes of the removable dental appliance are configured to reposition the one or more teeth of the patient from their initial positions to adjusted positions when the removable dental appliance is worn by the patient. The dimensions and shapes of the removable dental appliance include a position, dimension, and shape of each of a first shell shaped to receive a first tooth of the plurality of teeth, a second shell shaped to receive a second tooth of the plurality of teeth, and at least one jumper comprising an elongated structure having a first end and a second end. The first end of the at least one jumper is coupled to the first shell and the second end of the at least one jumper is coupled to the second shell. The at least one jumper is configured to apply a force between the first and second shells to cause a movement of at least one of the first and second teeth toward a desired position when the removable dental appliance is worn by the patient. The method also includes transmitting, by the computing device, a representation of the removable dental appliance to a computer-aided manufacturing system.

In some examples, the disclosure describes non-transitory computer-readable storage medium that stores computer system-executable instructions that, when executed, configure a processor to receive, by a computing device, a digital representation of a three-dimensional (3D) dental anatomy of a patient. The dental anatomy includes initial positions of one or more teeth of the patient. The non-transitory computer-readable storage medium also stores computer system-executable instructions that, when executed, configure the processor to determine, by the computing device, dimensions and shapes of a removable dental appliance for the patient. The removable dental appliance includes an appliance body configured to at least partially surround a plurality of teeth of a dental arch of a patient. The dimensions and shapes of the removable dental appliance are configured to reposition the one or more teeth of the patient from their initial positions to adjusted positions when the removable dental appliance is worn by the patient. The dimensions and shapes of the removable dental appliance include a position, dimension, and shape of each of a first shell shaped to receive a first tooth of the plurality of teeth, a second shell shaped to receive a second tooth of the plurality of teeth, and at least one jumper comprising an elongated structure having a first end and a second end. The first end of the at least one jumper is coupled to the first shell and the second end of the at least one jumper is coupled to the second shell. The at least one jumper is configured to apply a force between the first and second shells to cause a movement of at least one of the first and second teeth toward a desired position when the removable dental appliance is worn by the patient. The non-transitory computer-readable storage medium also stores computer system-executable instructions that, when executed, configure the processor to transmit, by the computing device, a representation of the removable dental appliance to a computer-aided manufacturing system.

The details of one or more examples of this disclosure are set forth in the accompanying drawings and the description below. Other features, objects, and advantages of this disclosure will be apparent from the description and drawings, and from the claims.

BRIEF DESCRIPTION OF THE DRAWINGS

FIGS. 1A to 1J illustrate different views of an example removable dental appliance that includes at least one jumper configured to apply a force to cause movement of at least one tooth of a patient toward a desired position.

DETAILED DESCRIPTION

Figure 1A:
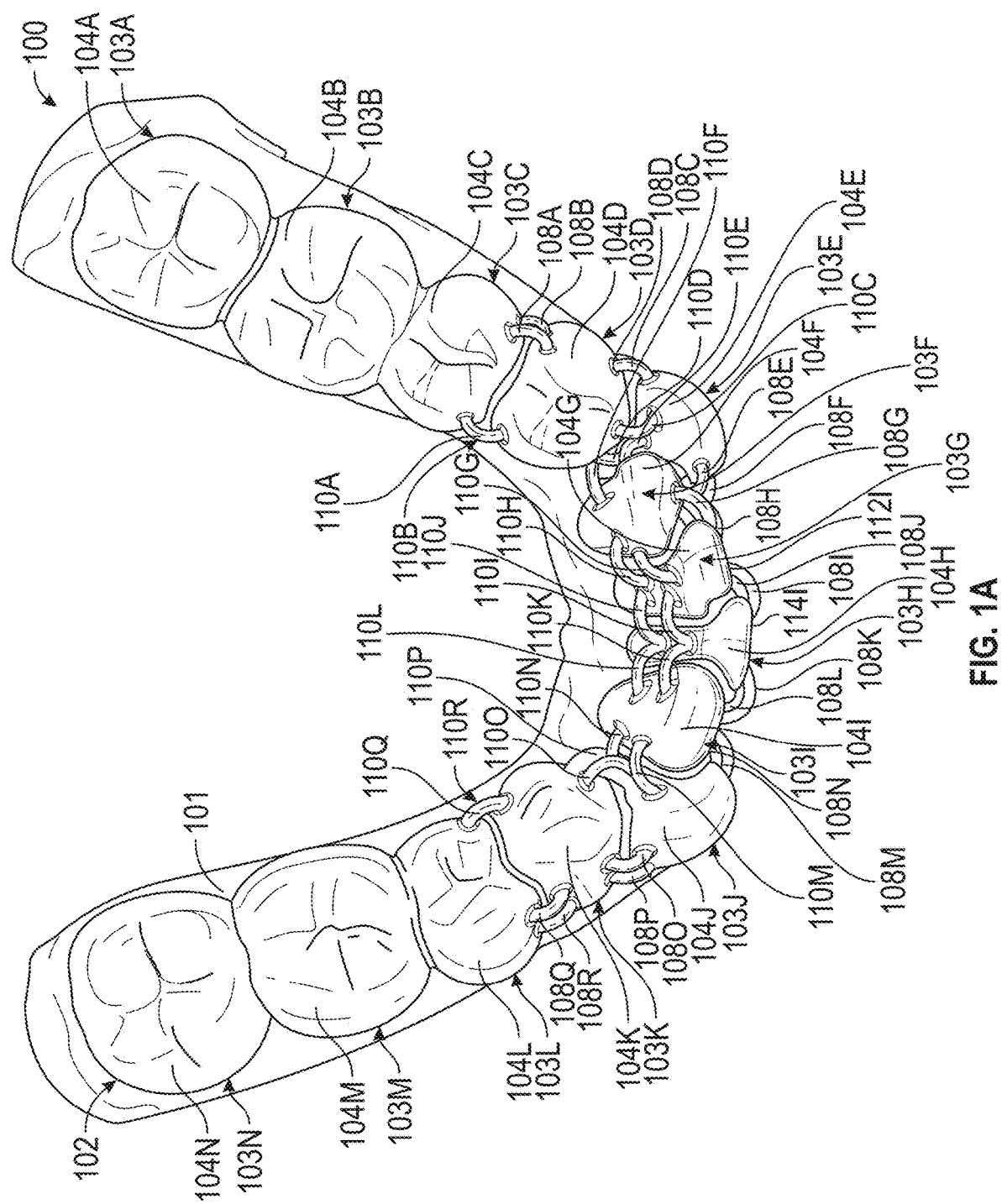

This disclosure describes removable dental appliances that includes a plurality of shells and at least one jumper. The removable dental appliance includes an appliance body configured to at least partially surround a plurality of teeth of a patient. The appliance body comprises a first shell shaped to receive a first tooth; a second shell shaped to receive a second tooth; and an at least one jumper. The at least one jumper includes an elongated structure having a first end coupled to the first shell and a second end coupled to the second shell. The at least one jumper is configured to apply a force between the first shell and the second shell. The force may be selected to cause movement of at least one of the first or second tooth toward a desired position when the removable dental appliance is worn by the patient.

Orthodontic treatment with the removable dental appliances described in this disclosure may include the use of at least one jumper between adjacent shells to enable greater control of force vectors applied to the teeth of the patient. The at least one jumper may include an elongated structure extending over an interproximal region between adjacent teeth and having first and second ends coupled to respective shells engaged with the adjacent teeth. For example, the at least one jumper may extend over an interproximal region including the region between a distal portion of a first shell that receives a first tooth and a mesial portion of a second shell that receives a second tooth to join the first shell and the second shell. During use of the removable dental appliances, the at least one jumper and the shells may result in the removable dental appliance being deformed such that at least some of the shells are positioned in an intermediate position different from an initial position of a tooth, e.g., a maloccluded position. The intermediate position may be between the initial position of the tooth and a desired position of the tooth resulting from the orthodontic treatment. As the removable dental appliance is deformed, substantially all of the deformation may occur in the at least one jumper, leaving the shells substantially undeformed. The at least one jumper may apply a force to a respective shell in response to the deformation, e.g., a restorative force in which the at least one jumper is moving toward an undeformed configuration. Deformation of the at least one jumper may result in at least one force, such as bending, twisting, compression, tension, and shear, in the at least one jumper. The force on the shells may result in force vectors on one or more teeth of the patient. In this way, the at least one jumper may be configured to apply a force to move the teeth of a patient.

By concentrating the deformation in the at least one jumper, a respective shell may remain more highly engaged with a respective tooth. For example, when the removable dental appliance is in a deformed state, e.g., worn by the patient, the shells may have more points of contact with a respective tooth, a greater surface area of contact on a respective tooth, or the like, compared to a removable dental appliance without at least one jumper. In this way, the removable dental appliance may improve engagement of teeth in the shells, concentrate deformation in the at least one jumper, or both. By separating the force-generating members (e.g., the at least one jumper) and the engagement members (e.g., the shells), the removable dental appliances described herein may allow greater control of forces, including magnitudes and directions, applied to teeth. In contrast, removable dental appliances that do not include at least one jumper, or other similar features, the appliance body both engages a surface of a tooth and delivers a force to move the tooth during orthodontic treatment. The degree of tooth engagement (e.g., the amount and positions of shell/tooth contact) may affect control of the force applied to the tooth.

In some examples, the at least one jumper may be configured to control the magnitude or direction of force applied to a respective shell, and the resulting force applied to the respective tooth. For example, the at least one jumper may be positioned and shaped to provide a specific force to at least one shell. The force on the respective shell may result in a specific force vector on the respective tooth. For example, the force vector may be applied to the shell in a direction or a magnitude that may not be possible to apply to the shell without the at least one jumper. The at least one jumper may also enable expression of a force over a greater distance. For example, the elongated structure of the at least one jumper may be longer than a length of an interproximal region between adjacent teeth (or adjacent shells). The length of the elongated structure may allow the at least one jumper to express a force as the elongated structure extends, recoils, or otherwise reacts to at least one force, such as bending, twisting, compression, tension, and shear. The at least one force may be expressed until the elongated structure reacts to the extent that the at least one force is insufficient to move the teeth. For example, movement of a tooth may cease when the force resulting from the at least one force in the at least one jumper is less than the force necessary to result in alveolar bone remodeling. In this way, the removable dental appliance may improve control of at least one of force vector direction, magnitude, or expression length, to achieve a desired tooth movement over a shortened treatment time, with fewer progressions of removable dental appliances in a set of removable dental appliances, or both, compared to other orthodontic treatments.

FIGS. 1A to 1J illustrate different views of an example removable dental appliance 100 engaged with teeth 103A, 103B, 103C, 103D, 103E, 103F, 103H, 103I, 103J, 103K, 103L, 103M, 103N (collectively, "teeth 103") of the mandibular arch 101 of a patient. Removable dental appliance 100 may include an aligner tray. For example, removable dental appliance 100 includes an appliance body 102 including a plurality of shells 104A, 104B, 104C, 104D, 104E, 104F, 104H, 104I, 104J, 104K, 104L, 104M, 104N (collectively, "shells 104") and at least one jumper 108A, 108B, 108C, 108D, 108E, 108F, 108H, 108I, 108J, 108K, 108L, 108M, 108N, 108O, 108P, 109Q, 108R and 110A, 110B, 110C, 110D, 110E, 110F, 110H, 110I, 110J, 110K, 110L, 110M, 110N, 110O, 110P, 110Q, 110R (collectively, "jumpers 108 and 110"). Jumpers 108 and 110 may include facial jumpers 108A-108R (collectively, "facial jumpers 108") and lingual jumpers 110A-110R (collectively, "lingual jumpers 110"). Jumpers 108 and 110 connect to shells 104. Respective jumpers of jumpers 108 and 110 are configured to apply forces to at least one respective shell of shells 104. For example, jumpers 108I, 108J, 110I, and 110J may be configured to apply a force to at least one of first shell 104G and second shell 104H to cause movement of at least one of first tooth 103G and second tooth 103H toward a desired position. By utilizing shells 104 and jumpers 108 and 110, removable dental appliance 100 may separate engagement of teeth 103 from force application, which may improve control of the direction, magnitude, or length of expression of force vectors to enable particular tooth movements, shortened treatment time, or reduce the number of removable dental appliances in a set of removable dental appliances to achieve a desired tooth movement, compared to other orthodontic appliances.

Appliance body 102 may be configured to at least partially surround two or more teeth 103 of either the maxillary dental arch or, as shown in FIGS. 1A-1J, the mandibular dental arch 101 of the patient. For example, appliance body 102 may surround at least one of the facial, lingual, and occlusal surfaces of teeth 103, overlap a portion of the gingiva of the patient, or both. In some examples, appliance body 102 may surround different portions of different teeth 103.

Appliance body 102 includes shells 104 shaped to receive a respective tooth of teeth 103, including, for example, first shell 104G shaped to receive first tooth 103G and second shell 104H shaped to receive second tooth 103H. First and second teeth 103G and 103H may include anterior teeth (as shown in FIGS. 1A to 1J) or posterior teeth. In some examples, appliance body 102 may include a respective shell 104 for each respective tooth 103. In other examples, appliance body 102 may include fewer shells 104 than teeth 103, e.g., a shell of shells 104 may receive more than one tooth of teeth 103 or a number of teeth 103 may not be surrounded by shells 104 of appliance body 102. In some examples, a thickness of a respective shell of shells 104 may range between about 0.2 millimeters and about 2.0 millimeters thick, such as between about 0.5 and about 1.0 millimeters thick. In other examples, appliance body 102 may define more shells 104 than teeth 103, e.g., two or more shells 104 may surround at least a portion of one tooth of teeth 103. In some examples, shells 104 may surround the facial, lingual, and occlusal portions of teeth 103. In other examples, shells 104 may surround fewer portions of teeth 103, such as, for example, only the facial and lingual portions of teeth 103, or only one of the facial or lingual portions of teeth 103. A respective shell 104 may be shaped to engage a respective tooth of teeth 103. For example, a respective shell 104 may be shaped to define a cavity and a cavity surface that contacts at least one selected point, a selected surface area, or both of a respective tooth of teeth 103. By selecting the shape of a respective shell of shells 104, removable dental appliance 101 may control the locations of forces applied to a respective tooth of teeth 103.

Appliance body 102 may include one or more anchor shells configured to receive one or more anchor teeth. In some examples, anchor teeth may include one or more molar teeth, premolar teeth, or both, such as, teeth 103A-103C and 103L-103N, and anchor shells may include corresponding shells, such as, for example, shells 104A-104C and 104L-104N. In other examples, anchor teeth may include one or more anterior teeth, or a combination of one or more anterior and posterior teeth. Anchor shells 104A-104C and 104L-104N may be configured to allow portions of appliance body 102 to deform to result in a force sufficient to move (e.g., force sufficient to cause alveolar bone remodeling) anterior teeth 103A-103C and 103L-103N without resulting in sufficient force to move the respective anchor teeth 103A-103C and 103L-103N. In other examples, appliance body 102 may omit any one or more of anchor shells 104A-104C and 104L-104N. Anchor shells 104A-104C and 104L-104N may be coupled with jumpers or without jumpers (e.g., the surfaces of adjacent shells may be coupled without jumpers). Anchor shells 104A-104C and 104L-104N may improve control of force vectors resulting from jumpers 108 and 110 coupling shells 104D-104K engaging anterior teeth 103D-103K by providing a relatively immobile plane from which the force on a respective anterior tooth may be determined.

Appliance body 102 includes jumpers 108 and 110. In general, jumpers 108 may be positioned on the facial side of appliance body 102 between any number of adjacent or nonadjacent shells 104, and jumpers 110 may be positioned on the lingual side of appliance body 102 between any number of adjacent or nonadjacent shells 104. In some examples, a respective shell of shells 104 includes a crossover shell, the cross over shell including at least one facial jumper 108 coupled to the cross over shell and a facial side of a first adjacent shell of shells 104, and at least one lingual jumper 110 coupled to the cross over shell and a lingual side of a second adjacent shell of shells 104. In some examples, at least one jumper of jumpers 108 and 110 may be positioned over an occlusal surface of appliance body 102. For example, when full intercuspation of the teeth is not yet achieved, a jumper positioned over an occlusal surface of the teeth may not interfere with opposing teeth. In some examples, at least one jumper of jumpers 108 and 110 may pass over regions of gingiva to increase the length of the at least one jumper, reduce crowding of jumpers 108 and 110 in the interproximal regions, or both. Any number of jumpers 108 and 110 may be positioned on a respective shell, limited only by the surface area of the respective shell of shells 104 and the cross-sectional areas of the respective jumpers of jumpers 108 and 110. The number of jumpers 108 and 110 coupled to a respective shell of shells 104 may be different than the number of jumpers 108 and 110 coupled to a second respective shell of shells 104. When removable dental appliance 100 is worn by the patient, a deformation of removable dental appliance 100, e.g., movement of one or more of shells 104 from an intermediate position to an initial position of one or more of teeth 103, may result in deformation of one or more of jumpers 108 and 110. The deformation of a respective jumper of jumpers 108 or 110 may exert at least one of a bending force, a twisting force, a compressive force, a tensile force, or a shear force on the respective jumper. In some examples, substantially all of the force will be due to bending and twisting of the respective jumper. The respective jumper may exert a restorative force on one or more respective shells of shells 104 to relieve the force in the respective jumper, which causes movement of at least one respective teeth of teeth 103, that the respective shells surround, toward a desired position. For example, a deformation of jumper 108I may result in a force being applied to first shell 104G, second shell 104H, or both. The direction of the force applied to the shell of shells 104 by the jumper of jumpers 108, 110, or both may cause the shell of shells 104 to move in the direction of the force. As shells 104 are engaged with teeth 103, the force is transferred to teeth 103 to cause movement of teeth 103. For example, first shell 104G and second shell 104H may transfer the force to the respective first tooth 103G and second tooth 103H.

The direction of the force on the respective tooth 103 may result from a location or locations of engagement of at least one surface of respective shell 104 with at least one surface of respective tooth 103 and attachment points of jumpers 108 and 110 to shells 104. For example, a force applied by a jumper of jumpers 108 and 110 may be concentrated at the attachment point of the jumper to the shell. Thus, the direction of the applied force to a tooth of teeth 103 may be selected by selecting an attachment point of one or more jumper of jumpers 108 and 110 to the shell of shells 104 that engages the tooth.

An equilibrium state (e.g., rest state) of jumpers 108 and 110 may define the desired position of the shells such that when removable dental appliance 100 is worn by the patient, jumpers 108 and 110 assume a deflection resulting in forces with proper directions and magnitudes to move teeth 103 into the desired positions. In some examples, the dimensions, shapes, and positions of jumpers 108 and 110 may be configured to improve the transmission of one or more forces, e.g., to control a direction or magnitude of at least one force, from jumpers 108 and 110 to shells 104 and teeth 103. For example, a force distributed substantially evenly across the facial surface of the tooth (or a lingual surface of the tooth) may cause a translation of the tooth. Hence, to achieve a translation of a tooth, the attachment points of the at least one jumper that attach to the shell that engages the tooth may be selected to distribute force substantially evenly across the facial surface of the tooth. A force concentrated on one half of a facial surface of a tooth, or one half of a facial surface and the opposite half of the lingual surface of the tooth, may cause a rotation, alone, or in combination with a translation. Hence, to achieve a rotation of a tooth, the attachment points of the jumpers that attach to the shell that engages the tooth may be selected to distribute force on one half of a facial surface of the tooth or one half of the facial surface and the opposite half of the lingual surface of the tooth. A force concentrated on an occlusal surface of a tooth may cause an intrusion. A force concentrated near a gingival margin of a tooth may cause an extrusion. A force concentrated on a portion of both the facial and occlusal surfaces of a tooth may cause a tipping. Other force vectors and combinations of force vectors that may result in one or more tooth movements are contemplated. In this manner, by selecting attachment points of jumpers 108 and 110 to shells 104, removable dental appliance 100 may be configured to apply a force with a particular direction and magnitude to teeth 103 (e.g., at least one of first tooth 103G, second tooth 103H, or both) that may result in any one or more of a corresponding rotational, translational, extrusive, intrusive, or tipping force to teeth 103.

By applying the force primarily via deformation of jumpers 108 and 110, respective shells 104 may more completely engage respective teeth 103 compared to clear tray aligners (CTAs) without jumpers 108 and 110. In this manner, removable dental appliance 100 may substantially decouple engagement of respective teeth 103 by respective shells 104 from application of the force to respective teeth 103 by jumpers 108 and 110. By decoupling engagement and force application, removable dental appliance 100 may improve control of force vector direction, magnitude, or both, to achieve a desired tooth movement compared to CTAs without jumpers 108 and 110.

Figure 1B:
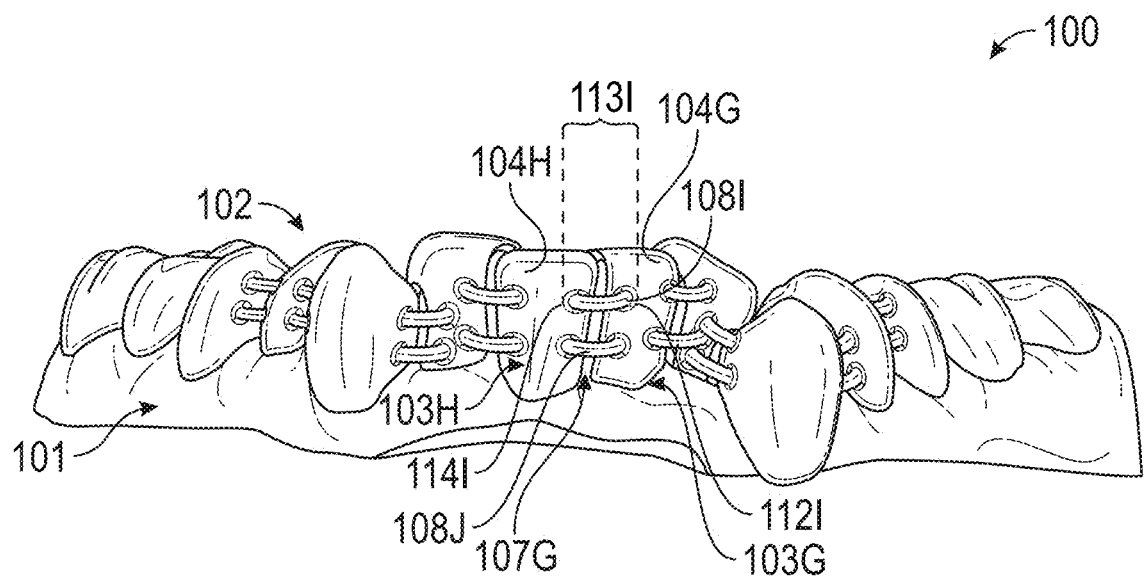

Each jumper of jumpers 108 and 110 may include a respective elongated structure having a first end and a second end. Each elongated structure of jumpers 108 and 110 may be similarly shaped or dissimilarly shaped. As seen in FIG. 1B, jumper 108I may include elongated structure 113I having first end 112I and second end 114I. Other jumpers of jumpers 108 and 110 may include similar elongated structures having first and second ends. Elongated structure 113I may extend over (in the mesial-distal direction) and away from at least a portion of interproximal region 107G between first tooth 103G and second tooth 103H to join first shell 104G and second shell 104H. In the example of FIG. 1B, which illustrates jumper 108I joining facial surfaces of shell 104G and 104H, elongated structure 113I extends away from at least a portion of interproximal region 107G in the facial direction. However, jumpers of jumpers 108 and 110 also may join lingual surfaces of shells 104, as shown in FIG. 1A. In examples in which jumpers 108 and 110 join lingual surfaces of shells 104, the elongated structures may extend away from at least a portion of interproximal region 107G in a lingual direction.

In some examples, the elongated structure of a jumper of jumpers 108 or 110 may extend over one or more teeth of teeth 103 to join shells 104 engaged with non-adjacent teeth 103. For example, a jumper may connect shell 104G and shell 104I (FIG. 1A), extending over tooth 103H and shell 104H. Joining shells 104 engaged with non-adjacent teeth may reduce localized bending stress in a jumper of jumpers 108 and 110. Reducing localized bending stress may enable jumpers 108 and 110 to be formed from materials of higher elastic modulus. Forming jumpers 108 and 110 from materials of higher elastic modulus may increase the durability of removable dental appliance 100, improve control of direction of the force applied to shells 104, or both.

Elongated structure 113I may include a curvilinear portion of appliance body 102. A curvilinear shape may reduce axial compression or tension in a respective jumper of jumpers 108 and 110. For example, elongated structure 113I may define an arc, zig-zag, sinusoid, spiral, or the like, between first end 112I and second end 114I. In some examples, elongated structure 113I may include at least one fold. The shape of elongated structure 113I may be selected to allow for a longer jumper without increasing the profile height of the jumper in the facial or lingual directions. Controlling the profile height may improve patient comfort when wearing removable dental appliance 102. Additionally, or alternatively, the shape of elongated structure 113I may be selected to result in bending of jumper 108I away from the dental anatomy. By bending away from the dental anatomy, jumper 108I may reduce or substantially prevent compressive forces on adjacent surfaces of appliance body 102 or forces that may impede movement of the respective shells 104 or respective teeth 103. In some examples, jumpers shaped as arc, zig-zag, sinusoid, spiral, or the like, hinges, slides, or both to establish an axis of rotation, an axis of translation, or both. For example, to achieve a large first order rotation of a tooth about an occlusal-gingival axis along the labial side of the mesial edge of the tooth, a pair of vertically separated jumpers may be used to form a bendable hinge. On the lingual side of the tooth, a relatively longer sinusoidal jumper might be used to connect the mesial edge of the rotating tooth to a second mesial tooth, e.g., skipping the immediate mesial tooth in order to achieve greater elongation of the jumper.

The length of elongated structure 113I may be greater than a length of a linear distance between the position at which first end 112I attaches to shell 104G and the position at which second end 114I attaches to shell 104H. The length of elongated structure 113I may affect the magnitude and length of expression of the force stored in jumper 108I. For example, longer jumpers 108 or 110 relative to the linear distance between attachment points may express a lesser force over a longer distance compared to shorter jumpers 108 or 110 relative to the linear distance between attachment points, which may express a greater force over a shorter distance. By selecting the length of respective jumpers 108 and 110, removable dental appliance 100 may control at least one of a magnitude and a length of expression of a force on respective shells 104, resulting from deformation of appliance body 102 concentrated in jumpers 108 and 110 when removable dental appliance 100 is worn by patient 12.

Along with the length of jumpers 108 and 110, the locations at which the first and second ends of a respective jumper of jumpers 108 and 110 attaches to respective shells of shells 104 may also be selected to affect the magnitude and direction of force resulting from deformation of appliance body 102 when removable dental appliance 100 is worn by the patient. Generally, first and second ends of jumpers 108 and 110 may be coupled to any portion of shells 104. For example, first end 112I of jumper 108I may be coupled to first shell 104G near an edge of first shell 104G, near a center of shell 104G, or any other portion of shell 104G. Coupling first end 112I near an edge of first shell 104G may enable the force to be transferred from jumper 108I to the edge of tooth 103G via first shell 104G in a mesial-distal direction, occlusal-gingival direction, or a lingual-facial direction. Applying the force near the edge of tooth 103G may enable, for example, a rotation of tooth 103G. Coupling first end 112I near the center of shell 104G may enable the force to be transferred from jumper 108I to the center of tooth 103G via first shell 104G in a mesial-distal direction, occlusal-gingival direction, or a lingual-facial direction. Applying the force near the center of tooth 103G may enable, for example, a translation of tooth 103G. In some examples, each of the first and second ends of a respective jumper 108 and 110 may be coupled to a respective shell of shells 104 at or near an axis of rotation of a respective tooth of teeth 103. For example, first end 112I may be coupled to first shell 104G at or near a first axis of rotation of first tooth 103G. Coupling first end 112I to first shell 104G may enable a desired tooth movement and reduce undesired movements. By coupling to a respective shell at or near an axis of rotation of the respective tooth, the at least one jumper 108 and 110 may enable greater control of a movement of a respective tooth.

Jumpers 108 and 110 may include an arcuate displacement of the appliance body 102. The initial fitting of removable dental appliance 100 to teeth 103 results in an initial compression or tension in jumpers 108 and 110. The compression or tension in jumpers 108 and 110 results in a bending or twisting of jumpers 108 and 110. The bending or twisting of jumpers 108 and 110 results in a deflection of jumpers 108 and 110. The deflection may be affected by the arcuate displacement of jumpers 108 and 110. The arcuate displacement may be affected by an outer radius of curvature, a thickness, an aspect ratio, a cross-sectional shape, an arc length, or the like, of the respective jumper of jumpers 108 and 110.

For example, jumpers 108 and 110 may include an arcuate shape having an outer radius of curvature between about 0.5 millimeters and about 5 millimeters. The outer radius of curvature is defined at an outermost surface of the jumper, e.g., a facial-most surface of a facially-oriented jumper of jumpers 108 or a lingual-most surface of a lingually-oriented jumper of jumpers 110. The outer radius of curvature may determine, at least in part, the direction and magnitude of the force applied by a respective jumper of jumpers 108 and 110 when removable dental appliance 100 is worn by the patient. For example, a larger radius of curvature may enable a respective jumper of jumpers 108 and 110 to store a larger force when deformed, deform in a direction that may result in a mesial-distal, an occlusal-gingival, a lingual-facial, or a combination thereof, direction of the force, or both. The outer radius of curvature may be selected to reduce a continuum of material along an axis of compression or tension when removable dental appliance 100 is fitted to teeth 103 In this way, the arcuate displacement of a respective jumper of jumpers 108 and 110 may be selected to control the direction and magnitude of the force applied by a respective jumper of jumpers 108 and 110 when removable dental appliance 100 is worn by the patient. The arcuate displacement, may define a displacement distance. For example, with respect to jumper 108I, the displacement distance may be a distance between a respective midline of a plane extending between first end 112I and second end 114I and a midline of the inner radius of jumper 108I. In some examples, the displacement distance may be less than about 2 millimeters, or less than about 1 millimeter, or less than about 0.5 millimeters, or about 0.5 millimeters.

A thickness of a respective jumper of jumpers 108 and 110 may be selected to control the magnitude and direction, or the location of concentration, of the force resulting from deformation of appliance body 102 when removable dental appliance 100 is worn by the patient. The thickness of jumpers 108 and 110 may be substantially constant or may vary along elongated structure (e.g., 113I). The transition between difference thickness of jumpers 108 and 110 may be gradual, e.g., tapered, or abrupt, e.g., stepwise. A stepwise transition may deliver a relatively flat force/displacement response when deflected in bending. In some examples, a thickness of jumpers 108 and 110 may be the same or similar to the thickness of shells 104 near the ends of jumpers 108 and 110, and may be less than the thickness of shells 104 between the ends of jumpers 108 and 110. In other examples, a thickness of jumpers 108 and 110 may be the same or similar to the thickness of shells 104 between the ends of jumpers 108 and 110, and may be less than the thickness of shells 104 near the ends of jumpers 108 and 110. The thickness of jumpers 108 and 110 may be between about 0.1 millimeters and about 1.0 millimeter, or about 0.3 millimeters and about 0.6 millimeters. A thickness of jumpers 108 and 110 may be less than a thickness of shells 104. The thinner jumpers 108 and 110 may be more flexible than the thicker shells 104. The more flexible jumpers 108 and 110 may deform before shells 104 when appliance body 102 deforms when worn by the patient. In this manner, the force caused by the deformation of appliance body 102 may be concentrated in jumpers 108 and 110. By concentrating the force in jumpers 108 and 110, the force may be controlled at least by selecting a thickness of jumpers 108 and 110. For example, assuming jumpers 108 and 110 are substantially similar, other than thickness, if jumper 108I is thicker than jumpers 108J, 110I, and 110J, jumper 108I may cause a greater force to be applied on first and second shells 104G and 104H near the occlusal surfaces of first and second teeth 103G and 103H, which may result in a translation, tipping, or rotation such that the occlusal surfaces of first and second teeth 103G and 103H move away from each other. In this way, the force concentrated in jumpers 108 and 110 may be controlled by controlling a thickness of at least one jumper 108 and 110.

The cross-sectional shapes of jumpers 108 and 110 also may affect the direction and magnitude of force applied by the respective jumper. Jumpers 108 and 110 may include respective cross-sections in a plane perpendicular to the longitudinal axis of the elongated body of the jumper. The cross-section may include any symmetrical, anisotropic, or asymmetrical shape. For example, a symmetrical cross-section may include a cross-section that is circular, elliptical, superelliptical, square, rectangular, polygonal, or the like. The shape, area, or aspect ratio of the cross section may affect the direction, magnitude, or length of expression of the force of jumpers 108 and 110. For example, the aspect ratio of the cross-section of jumpers 108 and 110 may be selected to control intended direction of the applied force. For instance, an increase in cross-sectional thickness in a desired plane of motion (e.g., direction of the desired force vector) with a relative decrease in thickness in the orthogonal plane will result in higher forces, greater resistance to deformation, or both in the desired plane of motion. Conversely, a decrease in cross-sectional thickness in a desired plane of motion (e.g., direction of the desired force vector) with a relative increase in thickness in the orthogonal plane will result in lower forces, less resistance to deformation, or both in the desired plane of motion. In this way, the aspect ratio of jumpers 108 and 110 cross-sections may be selected to control a direction of the force to urge a tooth of teeth 103 in one direction while inhibiting movement of the tooth in another direction, add overall durability to the appliance without impeding its ability to express in the desired directions, or both.

The shape, area, or aspect ratio of the cross section may be consistent along the longitudinal axis of jumpers 108 and 110, or may vary along the longitudinal axis of jumpers 108 and 110. As one example, jumper 108I may include a greater cross-sectional area near first end 112I than near second end 114I, resulting in a greater magnitude and length of expression of the force near second end 114I with greater directional control of the force near first end 112I. As a specific example, the area of the cross-sections of jumpers 108 and 110 may be varied along the longitudinal axis to achieve a more constant force response curve compared to a jumper with a constant cross-sectional area. For example, a respective jumper 4.0 millimeters in length may have a 1.0 millimeter diameter within 1.0 millimeter of each respective first and second end, and may have a 0.75 millimeter diameter along the middle 2.0 millimeters of the elongated body. By introducing this kind of stepwise cross-section, the otherwise linear, but unequally sloped, force response curves of the jumper sum together in such a way as to result in a nonlinear force response curve with a relatively flattened response for at least a portion of the force response curve. The relatively flattened force response curve may cause a more constant force delivery over a greater length of force expression compared to a jumper with a constant cross-sectional area. The more constant force delivery may allow the removable dental appliance 100 to maintain safe and effective force levels over a greater length of force expression, maximize the rate of tooth movement over the treatment period, reduce pain experienced by the patient due to the force, and the like.

Other examples of variations in at least one of the cross-sectional shape, area, and aspect ratio are contemplated. By selecting at least one of the cross-sectional shape, area, and aspect ratio of jumpers 108 and 110, removable dental appliance 100 may control at least one of a direction, a magnitude, and a length of expression of a force on shells 104, resulting from deformation of appliance body 102 (concentrated in jumpers 108 and 110) when removable dental appliance 100 is worn by the patient.

Figure 1C:
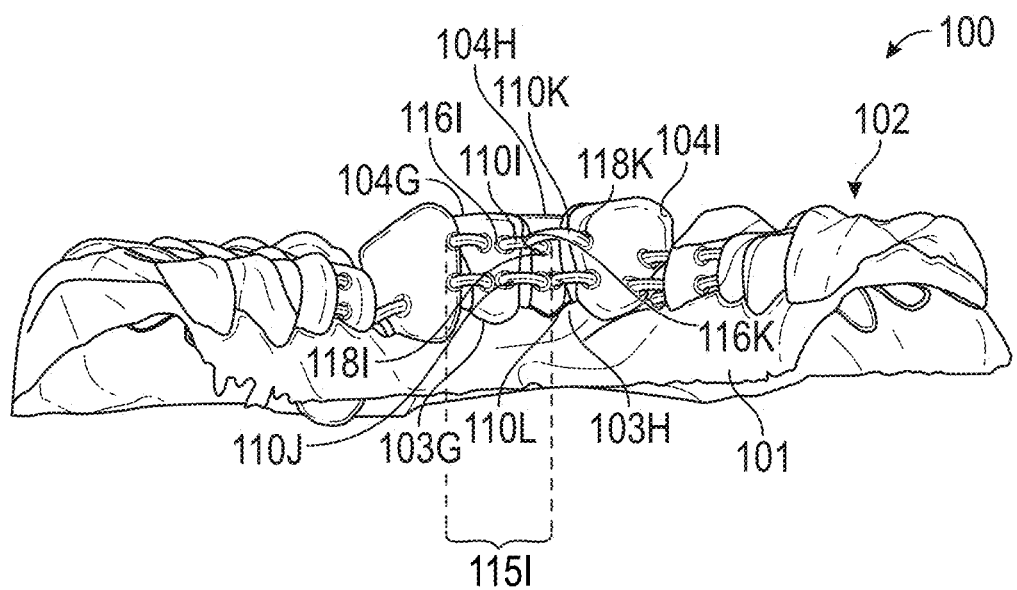
Figure 1D:
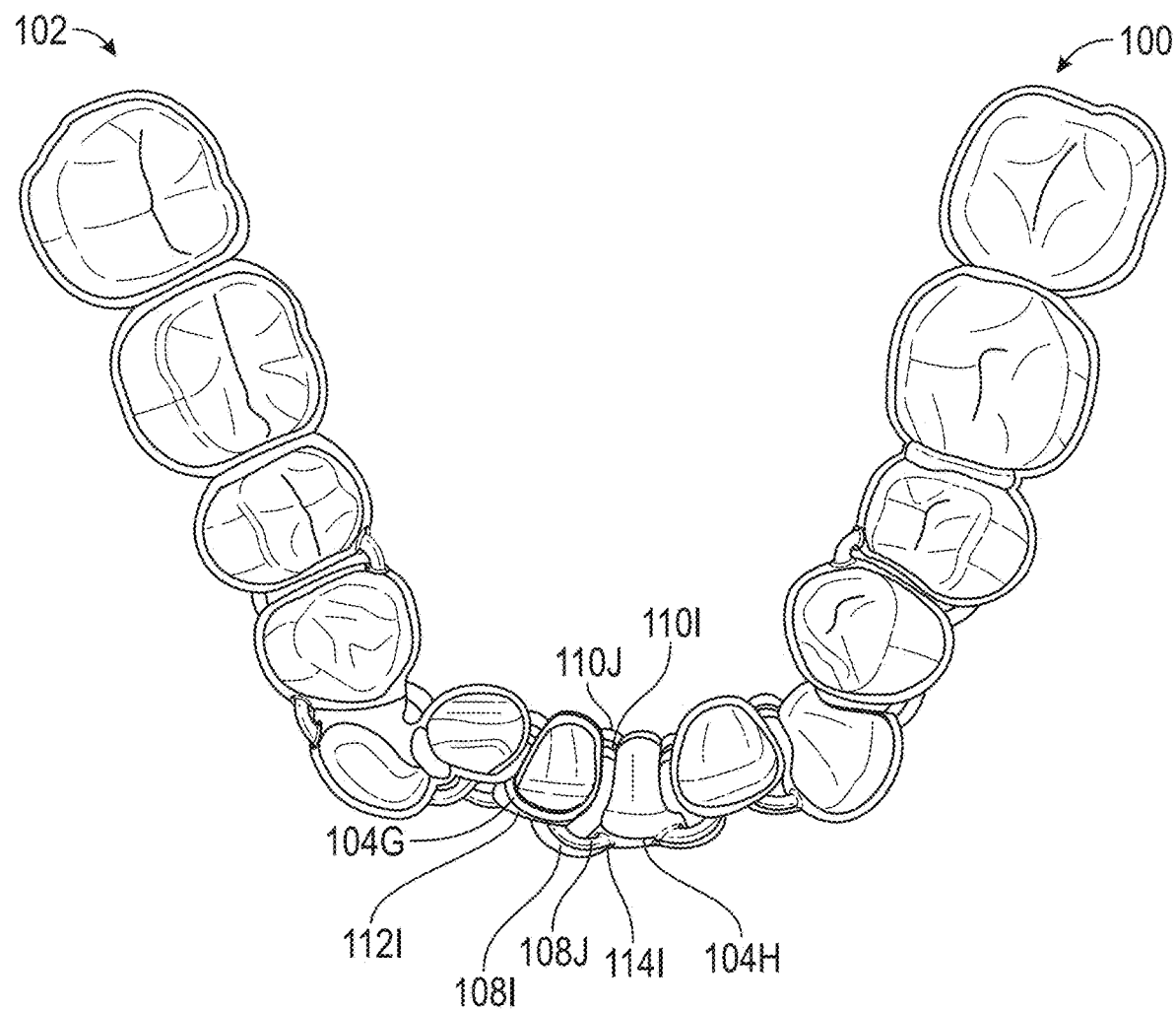
Figure 1E:
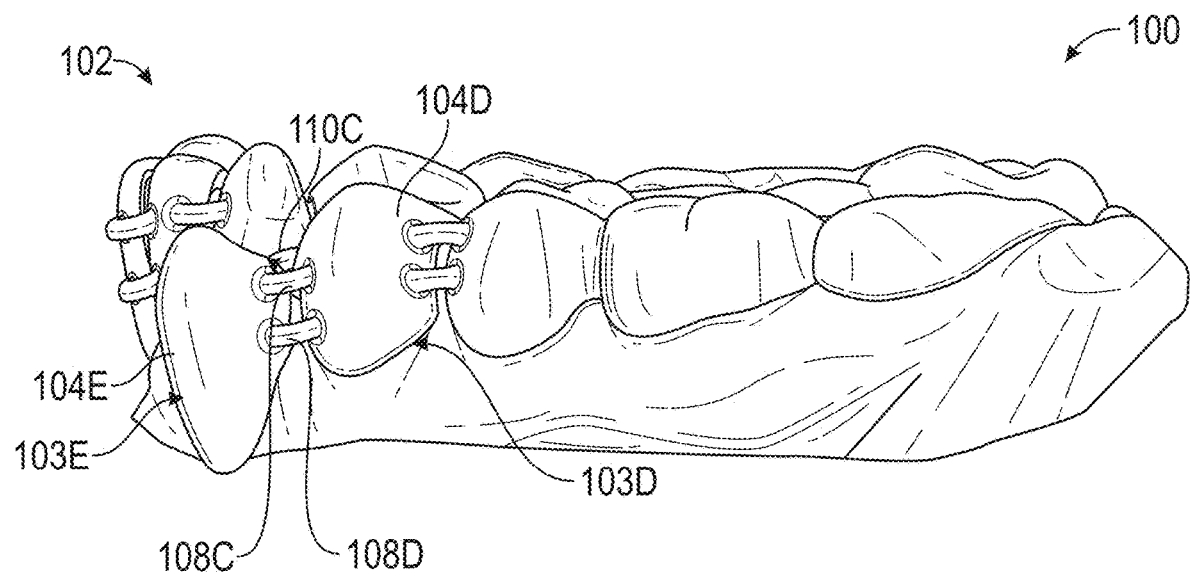
Figure 1F:
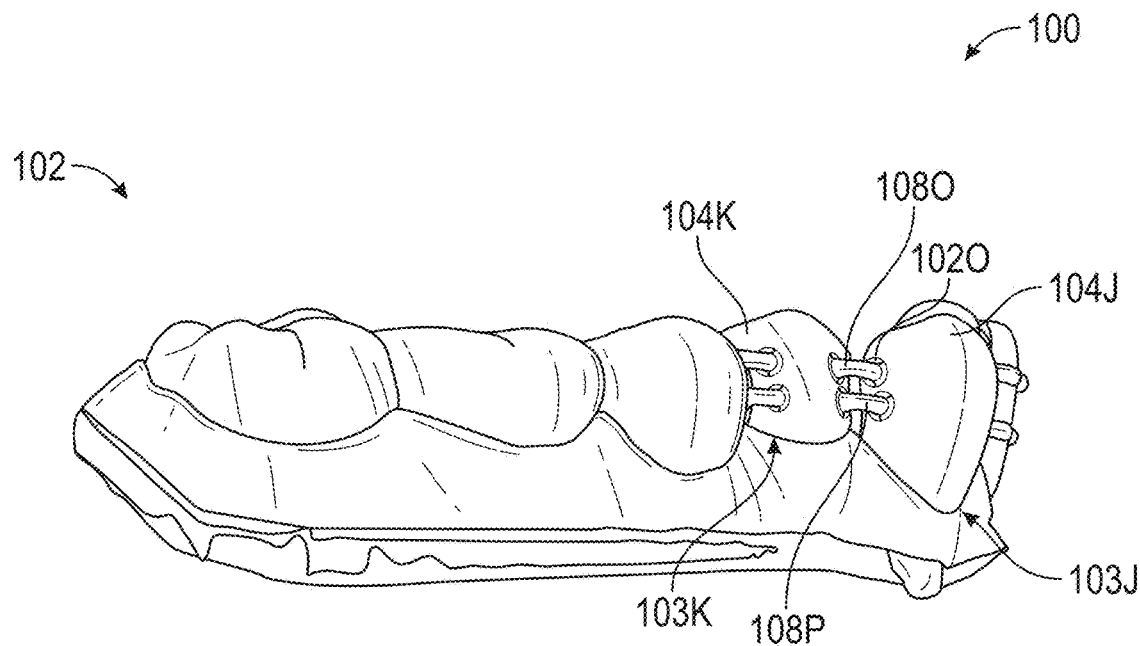
Figure 1H:
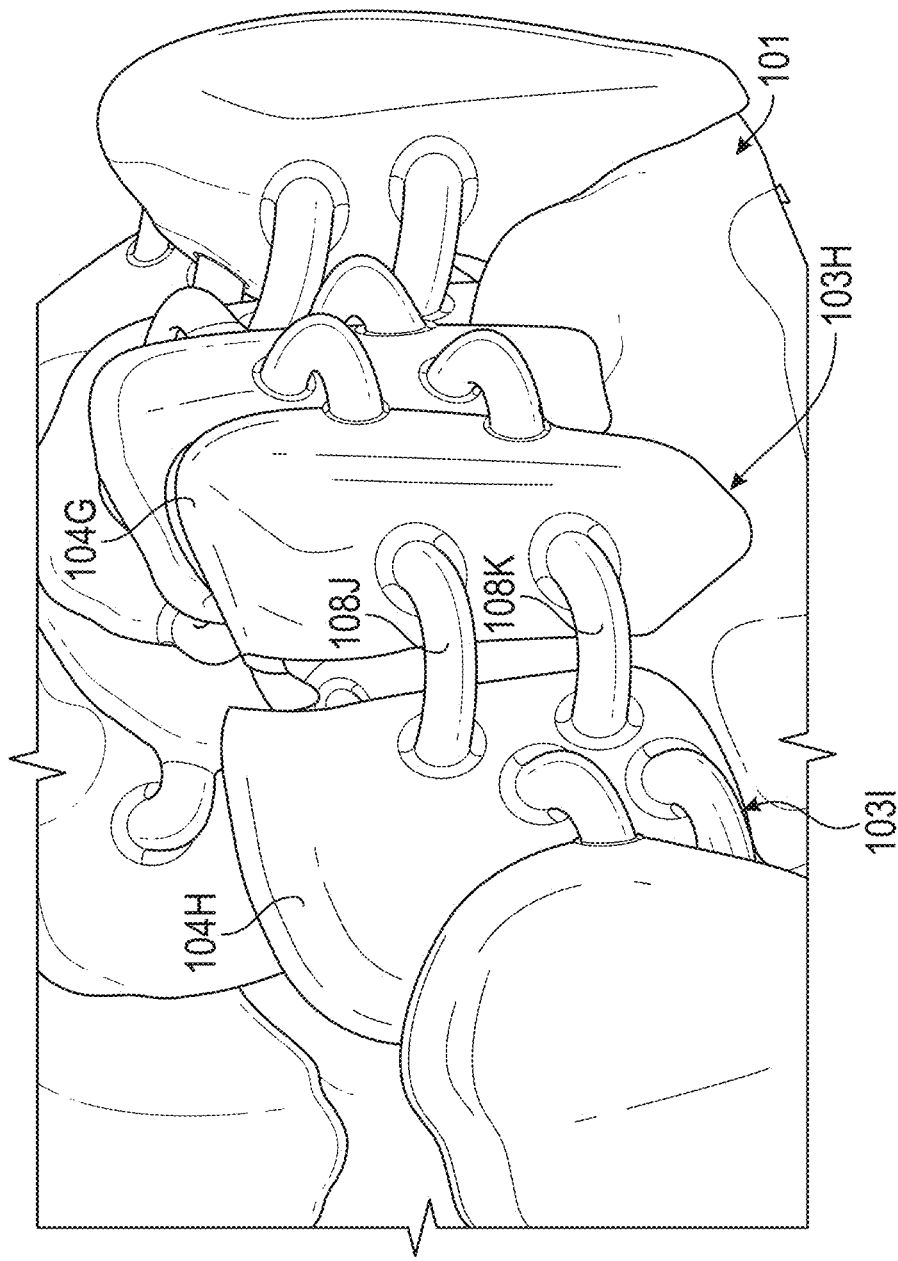
Figure 1I:
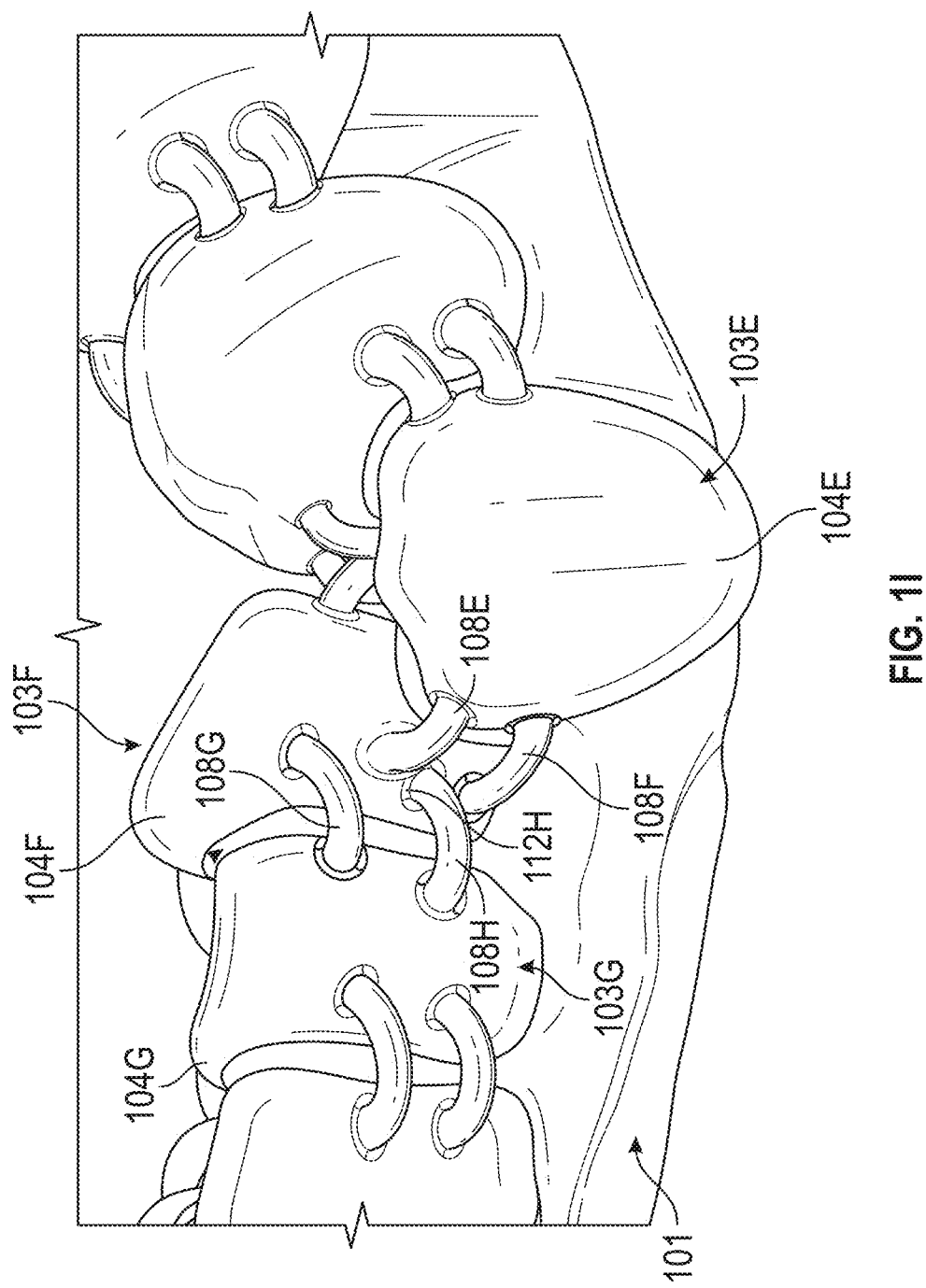
Figure 1J:
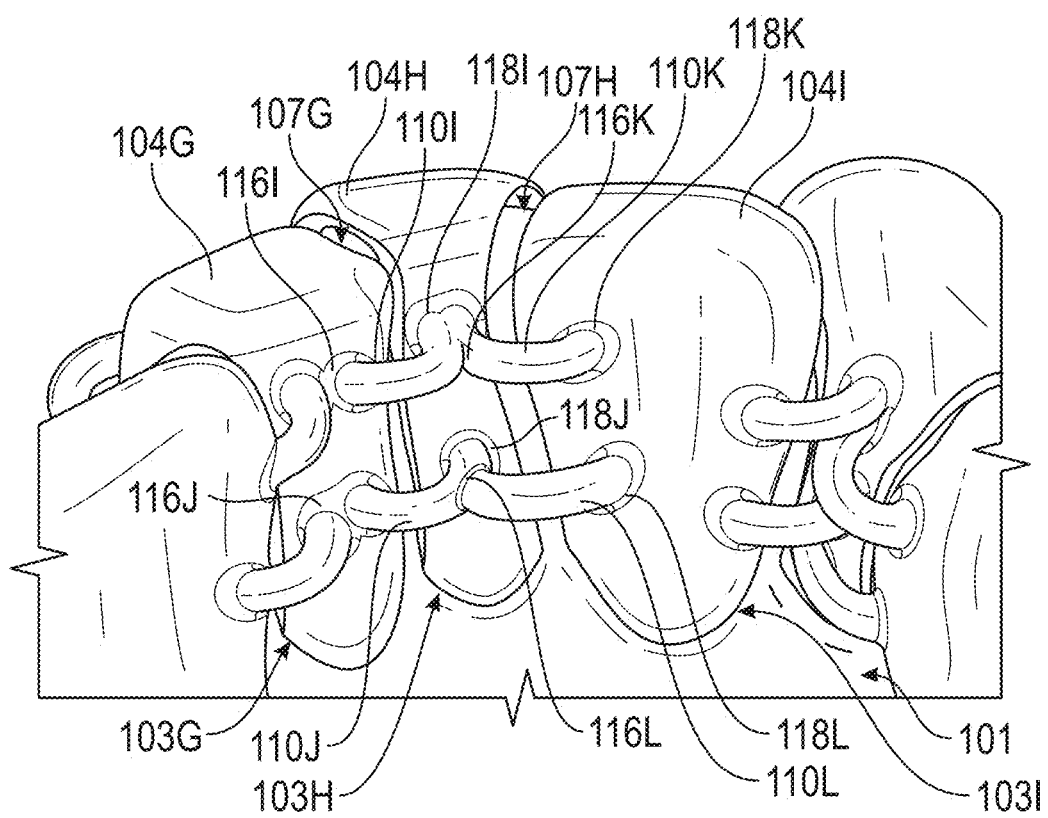

In some examples, at least one of jumpers 108 and 110 may be coupled to the elongated structure of at least one different jumper of jumpers 108 and 110, rather than directly to one of shells 104. For example, as shown in FIG. 1C, first end 116I of jumper 110I may be coupled to shell 104G and second end 118I of jumper 110I may be coupled to shell 104H. First end 116K of jumper 110K may be coupled to the elongated structure 115I of jumper 110I and second end 118K of jumper 110K may be coupled to shell 104I. When worn by the patient, deformation of appliance body 102, including jumpers 110I and 110K, may cause a force to be applied from jumper 110K to jumper 110I, and from jumper 110I to shell 104G. In this way, force from jumpers 110I and 110K may cascade to result in a combined force on shell 104G. As another example, as shown in FIG. 1J, first end 116J of jumper 110J may be coupled to shell 104G and second end 118J of jumper 110J may be coupled to shell 104H. First end 116L of jumper 110L may be coupled to the elongated structure of jumper 110J and second end 118L of jumper 110L may be coupled to shell 104I. When worn by the patient, deformation of appliance body 102, including jumpers 110L and 110J, may cause a force to be applied from jumper 110L to jumper 110J, and from jumper 110J to shell 104G. In this way, force from jumpers 110L and 110J may cascade to result in a combined force on shell 104G. In other examples, at least one respective jumper may be coupled at a respective first end to a respective first different jumper and at a respective second end to a respective second different jumper. In this way, the at least one jumper may be configured to result in a cascading force arrangement. The combined force may be greater than the force that may be applied by individual jumpers 110I and 110K. By using a cascading force arrangement, jumpers 110I and 110K may be thinner, shorter, have a smaller arcuate displacement, or the like, to reduce localized bending stresses or twisting stresses on individual jumpers 110I and 110K and still achieve the desired combined force.

In some examples, at least a portion of appliance body 102 may define a gingival portion. The gingival portion includes an arch-shaped portion of appliance body 102 extending beyond at least a portion of the gingiva, alveolar process, or both (e.g., overlapping gingival margin). For example, first end (e.g., 112I) of at least one jumper of jumpers 108 may be coupled to the gingival portion. In some examples, jumpers 108 and 110 may be configured to couple shells 104 only to the gingival portion without coupling shells 104 to other shells 104. The at least one jumper of jumpers 108 may be configured to anchor to at least a portion of the alveolar process. For example, when worn by the patient, at least one jumper of jumpers 108 may at least partially contact the gingiva overlying the alveolar process to result in at least a portion of the deformation of the at least one jumper of jumpers 108. In this way, removable dental appliance 100 may be configured to utilize the alveolar process as an anchor.

For example, including one or more jumpers 108 or 110 coupled to one or more respective portions of shells 104 that extend to contact the gingiva may access additional bracing provided by the extended surface indirectly engaging with the alveolar process without impeding mobility of teeth 103. Additional, or alternatively, by increasing a number of jumpers 108 or 110 coupled to a single shell of shells 104, greater force could be applied to a selected tooth of teeth 103 while using the more rigid alveolar process as an anchor instead of neighboring teeth. As such, another advantage could be better control of tooth movements relative to a fixed reference (the alveolar process), without causing unwanted reactionary movements of neighboring teeth.

In some examples, appliance body 102 may be formed from a unitary material, a multilayer composite material, or the like. A unitary material may include a single polymer, or substantially homogeneous mixture of one or more polymers. For example, removable dental appliance 100 may consist of a single, continuous, 3D printed or thermoformed component. A multilayer composite material may include multiple layers of a single material, e.g., a single polymer, or multiple layers of a plurality of materials, e.g., two or more polymers, a polymer and another material. Multi-layer materials may enable one or more portions of appliance body 102 to be formed with a plurality of layers having different elastic modulus to enable selection of force characteristics, displacement characteristics, or both of jumpers 108. For example, removable dental appliance 100 may consist of a multilayer 3D printed or thermoformed component. Suitable polymers may include, but are not limited to, (meth)acrylate polymer; epoxy; silicones; polyesters; polyurethanes; polycarbonate; thiol-ene polymers; acrylate polymers such as urethane (meth)acrylate polymers, polyalkylene oxide di(meth)acrylate, alkane diol di(meth)acrylate, aliphatic (meth)acrylates, silicone (meth)acrylate; polyethylene terephthalate based polymers such as polyethylene terephthalate glycol (PETG); polypropylene; ethylene-vinyl acetate; or the like.

In some examples, removable dental appliance 100 may include chamfers or fillets on edges of appliance body 102 and other spaces. As one example, first and second shells 104G and 106H of appliance body 102 may increase in thickness by a chamfer, a fillet, or the like near first and second ends 112I and 114I of jumper 108I. Chamfers or fillets near the first and second ends 112I and 114I may increase the rigidity of the joint between jumper 108I and the respective first and second shells 104G and 104H. Chamfers or fillets also may reduce the number of angular, abrupt, or sharp transitions on a surface of appliance body 102, smooth such transitions, or both. Chamfers or fillets also may reduce localized stress, improve the transmission of force between the jumpers and the shells, or both. In this way, the thickness of appliance body 102 may be selected to improve rigidity, improve patient comfort, reduce the visibility of removable dental appliance 100, or the like.

In other examples, removable dental appliance 100 may include metallic components configured to enhance forces applied by removable dental appliance 100 to one or more of the surrounded teeth. The metallic component may comprise a wire or ribbon extending through at least a portion of jumpers 108 and 110. For example, jumpers 108 and 110 may include at least one metal wire. The metal wire may be attached to shell 104 using at least one of adhesive bonding, melting the wire into the shell material, forming shells 104 with wire-receiving channels to facilitate adhesive or mechanical bonding, or the like. The metal wire may be pre-bent, e.g., by a wire-bending robot. A continuous metal wire may span at least one interproximal region, both at least one interproximal region and at least a portion of at least one facial or lingual surface of a respective shell of shells 104, or the like. A separate wire may be used for each series of jumpers of jumpers 108 and 110 lying in roughly the same horizontal plane. The metal wire may include higher strength, smaller cross-section (thinner), and greater flexibility, compared to a comparable plastic jumper designed for the same force delivery. For example, the comparable plastic jumper designed for the same force delivery may require a greater diameter than the metal wire, such that the compression, tension, or shear strain in the outer surfaces of the comparable plastic jumper may be greater for the same amount of bending or twisting deflection. The greater compression, tension, or shear strain in the outer surfaces of the comparable plastic jumper may cause the yield stress or fracture stress limit of the comparable plastic jumper to be reached sooner than for the metal wire.

In some examples, removable dental appliance 100 may include one or more other metal components, such as metal occlusal components, where greater durability is needed to overcome the stress of high-pressure occlusal contact, such as bruxing, or mastication. In some examples, removable dental appliance 100 may include catches to connect to an anchorage device implanted within the patient, e.g., a temporary anchorage device or mini-screw. For example, catches may be positioned on anchor shells 104A-104C and 104L-104N to connect to an anchorage device on anchor teeth 103A-103C and 103L-103N. In this manner, such removable dental appliances 100 may provide a hybrid construction of metal and plastic.

While plastic components may be generally clear for reduced visibility, metal components may include plating or other coloring to reduce visibility of the removable dental appliance when worn by the patient. For example, metal components positioned near the teeth of a patient when implanted may include white colored coating or plating, such as, for example, rhodium, silver, white anodized titanium, Teflon, PTFE, and the like, or be formed of a white colored metal, such as, for example, rhodium, silver, white anodized titanium, and the like. Metal components positioned elsewhere may be colored to generally match tissue color within the mouth of the patient.

Figure 2:
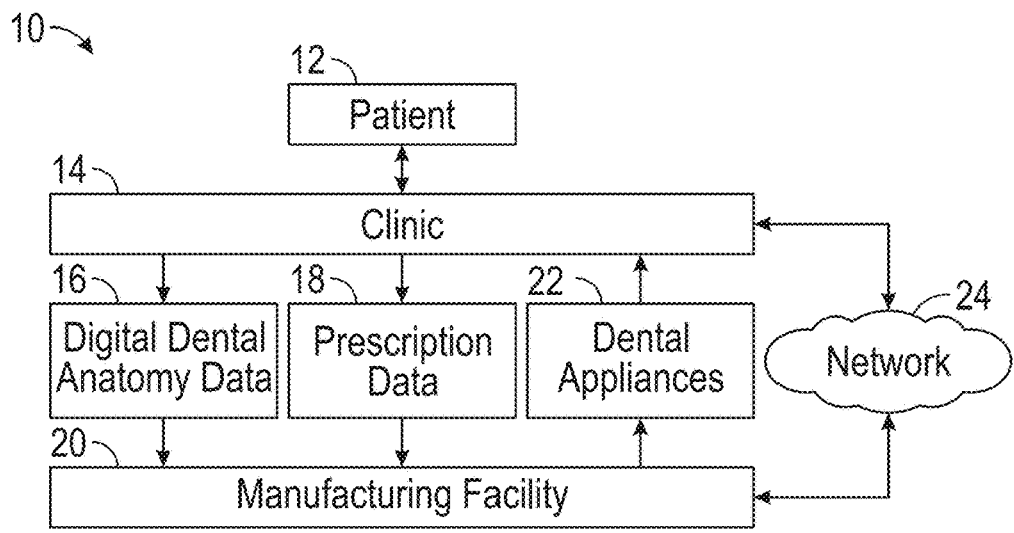
FIG. 2 is a block diagram illustrating an example computer environment in which a clinic and manufacturing facility communicate information throughout a dental appliance manufacturing process.

FIG. 2 is a block diagram illustrating an example computer environment 10 in which clinic 14 and manufacturing facility 20 communicate information throughout a manufacturing process a set of removable dental appliances 22 for patient 12. The set of removable dental appliances 22 may include removable dental appliance 100 of FIGS. 1A-1J, including appliance body 102, shells 104, and jumpers 108 and 110. Initially, an orthodontic practitioner of clinic 14 generates one or more images of a dental anatomy of patient 12 using any suitable imaging technique and generates digital dental anatomy data 16 (e.g., a digital representation of patient's 12 dental anatomy). For example, the practitioner may generate X-RAY images that can be digitally scanned. Alternatively, the practitioner may capture digital images of the patient dental anatomy using, for example, conventional computed tomography (CT), laser scanning, intra-oral scanning, CT scans of dental impressions, scans of dental casts poured from impressions, ultrasound instrumentation, magnetic resonance imaging (MRI), or any other suitable method of three-dimensional (3D) data acquisition. In other embodiments, the digital images may be provided using a hand-held intra-oral scanner such as the intra-oral scanner using active wavefront sampling developed by Brontes Technologies, Inc. (Lexington, Mass.) and described in PCT Publication No. WO 2007/084727 (Boerjes, et al.), which is incorporated by reference herein. Alternatively, other intra-oral scanners or intra-oral contact probes may be used. As another option, the digital dental anatomy data 16 may be provided by scanning a negative impression of patient's 12 teeth. As still another option, the digital dental anatomy data 16 may be provided by imaging a positive physical model of patient's 12 teeth or by using a contact probe on a model of patient's 12 teeth. The model used for scanning may be made, for example, by casting an impression of patient's 12 dentition from a suitable impression material such as alginate or polyvinylsiloxane (PVS), pouring a casting material (such as orthodontic stone or epoxy resin) into the impression, and allowing the casting material to cure. Any suitable scanning technique may be used for scanning the model, including those described above. Other possible scanning methods are described in U.S. Patent Publication No. 2007/0031791 (Cinader et al.), which is incorporated by reference herein.

In addition to providing digital images by scanning the exposed surfaces of the teeth, it is possible to image non-visible features of the dentition, such as the roots of patient's 12 teeth and patient's 12 jaw bones. In some embodiments, the digital dental anatomy data 16 is formed by providing several 3D images of these features and subsequently "stitching" them together. These different images need not be provided using the same imaging technique. For example, a digital image of teeth roots provided with a CT scan may be integrated with a digital image of the teeth crowns provided with an intraoral visible light scanner. Scaling and registering of two-dimensional (2D) dental images with 3D dental images is described in U.S. Pat. No. 6,845,175 (Kopelman, et al.), which is incorporated by reference herein, and U.S. Patent Publication No. 2004/0029068 (Badura et al.), which is also incorporated by reference herein. Issued U.S. Pat. No. 7,027,642 (Imgrund, et al.), which is incorporated by reference herein, and U.S. Pat. No. 7,234,937 (Sachdeva, et al.), which is also incorporated by reference herein, describe using techniques of integrating digital images provided from various 3D sources. Accordingly, the term "imaging" as it is used herein is not limited to normal photographic imaging of visually apparent structures, but includes imaging of dental anatomies that are hidden from view. The dental anatomy may include, but is not limited to, any portion of crowns or roots of one or more teeth of a dental arch, gingiva, periodontal ligaments, alveolar bone, cortical bone, implants, artificial crowns, bridges, veneers, dentures, orthodontic appliances, or any structure that could be considered part of the dentition before, during, or after treatment.

To generate digital dental anatomy data 16, a computer must transform raw data from the imaging systems into usable digital models. For example, for raw data representing the shapes of teeth received by a computer, the raw data is often little more than a point cloud in 3D space. Typically, this point cloud is surfaced to create 3D object models of the patient's dentition, including one or more teeth, gingival tissue, and other surrounding oral structure. For this data to be useful in orthodontic diagnosis and treatment, the computer may "segment" dentition surfaces to produce one or more discrete, movable 3D tooth object models representing individual teeth. The computer may further separate these tooth models from the gingiva into separate objects.

Segmentation allows a user to characterize and manipulate the teeth arrangement as a set of individual objects. Advantageously, the computer may derive diagnostic information such as arch length, bite setting, interstitial spacing between adjacent teeth, and even American Board of Orthodontics (ABO) objective grading from these models. As a further benefit, the digital orthodontic setups may provide flexibility in the manufacturing process. By replacing physical processes with digital processes, the data acquisition step and data manipulation steps can be executed at separate locations without the need to transport stone models or impressions from one location to another. Reducing or eliminating the need for shipping physical objects back and forth can result in significant cost savings to both customers and manufacturers of customized appliances.

After generating digital dental anatomy data 16, clinic 14 may store digital dental anatomy data 16 within a patient record in a database. Clinic 14 may, for example, update a local database having a plurality of patient records. Alternatively, clinic 14 may remotely update a central database (optionally within manufacturing facility 20) via network 24. After digital dental anatomy data 16 is stored, clinic 14 electronically communicates digital dental anatomy data 16 to manufacturing facility 20. Alternatively, manufacturing facility 20 may retrieve digital dental anatomy data 16 from the central database. Alternatively, manufacturing facility 20 may retrieve preexisting digital dental anatomy data 16 from a data source unassociated with clinic 14.

Clinic 14 may also forward prescription data 18 conveying general information regarding a practitioner's diagnosis and treatment plan for patient 12 to manufacturing facility 20. In some examples, prescription data 18 may be more specific. For example, digital dental anatomy data 16 may be a digital representation of the dental anatomy of patient 12. The practitioner of clinic 14 may review the digital representation and indicate at least one of desired movements, spacing, and final positions of individual teeth of patient 12. For example, the desired movements, spacing, or final positions of individual teeth of patient 12 may affect the forces to be applied to the teeth of patient 12 at each stage of treatment by each removable dental appliance of the set of removable dental appliances 22. As discussed above, the forces applied by each removable dental appliance (e.g., removable dental appliance 100) of the set of removable dental appliances 22 may be determined by selecting the dimensions, shapes, and positions of the at least one jumper (e.g., jumpers 108 and 110) and shells (e.g., shells 104). The at least one of desired movements, spacing, or final positions of individual teeth of patient 12 may enable the practitioner, a technician at manufacturing facility 20, and a computer at manufacturing facility 20 to determine at least one of selected dimensions, shapes, and positions of at least one jumper, at least one shell, or both. In this way, digital dental anatomy data 16 may include at least one of practitioner, technician, or computer selected dimensions, shapes, and positions of at least one of the at least one jumper and the shells of each of removable dental appliance of the set of removable dental appliances 22 to result in the desired movement of the teeth of patient 12. Following review of the digital representation, the digital dental anatomy data 16 that includes the selected dimensions, shapes, and positions of the at least one jumper and shells of each removable dental appliance of the set of removable dental appliances 22, may be forwarded to manufacturing facility 20. Manufacturing facility 20 may be located off-site, or located with clinic 14.

For example, each clinic 14 may include its own equipment for manufacturing facility 20 such that a treatment plan and digital design may be performed entirely by a clinical practitioner, or an assistant, in the clinical setting, using software installed locally. The manufacturing may be performed in the clinic, as well, by using a 3D printer (or by other methods of additive manufacturing). A 3D printer allows manufacturing of intricate features of a dental appliance or a physical representation of the dental anatomy of patient 12 through additive printing. The 3D printer may use iterative digital designs of original dental anatomy of patient 12 as well as a desired dental anatomy of patient 12 to produce multiple digital appliances and/or digital appliance patterns customized to produce the desired dental anatomy of patient 12. Manufacturing may include post-processing to remove uncured resin and remove support structures, or to assemble various components, which may also be necessary and could also be performed in a clinical setting.

Manufacturing facility 20 utilizes digital dental anatomy data 16 of patient 12 to construct the set of removable dental appliances 22 to reposition teeth of patient 12. Sometime thereafter, manufacturing facility 20 forwards the set of removable dental appliances 22 to clinic 14 or, alternatively, directly to patient 12. For example, the set of removable dental appliances 22 may be an ordered set of removable dental appliances. Patient 12 then wears the removable dental appliances 22 in the set of removable dental appliances 22 sequentially over time according to a prescribed schedule in order to reposition the teeth of patient 12. For example, patient 12 may wear each removable dental appliance in the set of removable dental appliances 22 for a period of between about 1 week and about 6 weeks, such as between about 2 weeks and about 4 weeks, or about 3 weeks. Optionally, patient 12 may return to clinic 14 for periodic monitoring of the progress of the treatment with removable dental appliances 22.

During such periodic monitoring, a clinician may adjust the prescribed schedule of patient 12 for wearing the removable dental appliances in the set of removable dental appliances 22 sequentially over time. Monitoring generally includes visual inspection of the teeth of patient 12 and may also include imaging to generate digital dental anatomy data. In some relatively uncommon circumstances, the clinician may decide to interrupt the treatment of patient 12 with the set of removable dental appliances 22, for example, by sending the newly generated digital dental anatomy data 16 to manufacturing facility 20 in order to produce a new set of removable dental appliances 22. In the same or different examples, the clinician may send newly generated digital dental anatomy data 16 to manufacturing facility 20 following the completion of the prescribed schedule of the treatment with removable dental appliances 22. In addition, following the completion of the prescribed schedule of the treatment with removable dental appliances 22, the clinician may request a new set of removable dental appliances from manufacturing facility 20 to continue treatment of patient 12.

Figure 3:
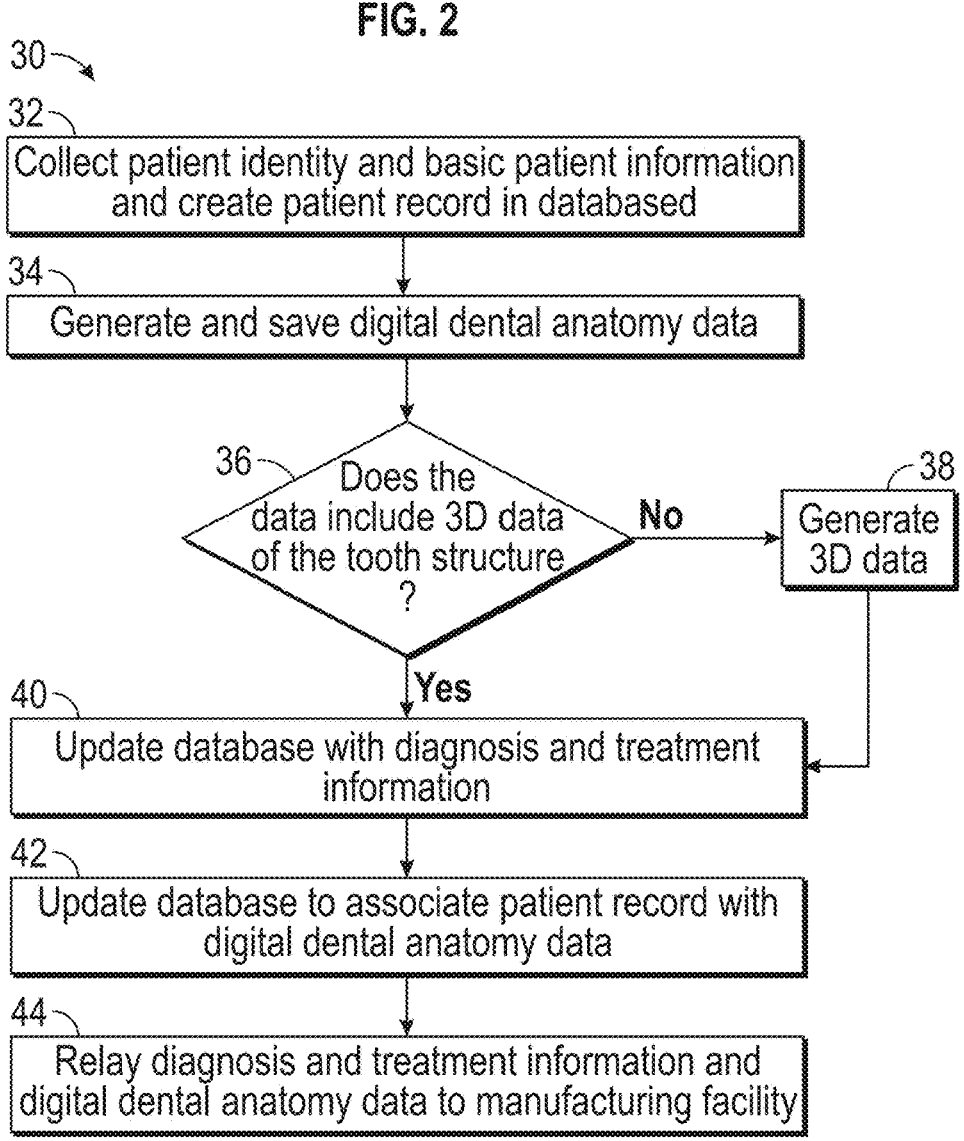
FIG. 3 is a flow diagram illustrating an example process of generating digital dental anatomy data.

FIG. 3 is a flow diagram illustrating process 30 of generating digital dental anatomy data conducted at clinic 14, in accordance with one example of this disclosure. Initially, a practitioner at clinic 14 collects patient identity and other information from patient 12 and creates a patient record (32). As described, the patient record may be located within clinic 14 and optionally configured to share data with a database within manufacturing facility 20. Alternatively, the patient record may be located within a database at manufacturing facility 20 that is remotely accessible to clinic 14 via network 24 or within a database that is remotely accessible by both manufacturing facility 20 and clinic 14.

Next, digital dental anatomy data 16 of patient 12 may be generated using any suitable technique (34), to thereby create a virtual dental anatomy. Digital dental anatomy data 16 may be comprised of a two-dimensional (2D) image and/or a three-dimensional (3D) representation of the dental anatomy. In one example, 3D representations of a dental anatomy are generated using a cone beam computerized tomography (CBCT) scanner, such as an i-CAT 3D dental imaging device (available from Imaging Sciences International, LLC; 1910 N Penn Road, Hatfield, Pa.). Clinic 14 stores the 3D digital dental anatomy data 16 (in the form of radiological images) generated from the CBCT scanner in the database located within clinic 14, or alternatively, within manufacturing facility 20. The computing system processes the digital dental anatomy data 16 from the CBCT scanner, which may be in the form of a plurality of slices, to compute a digital representation of the dental anatomy that may be manipulated within the 3D modeling environment.

If 2D radiological images are used (36), then the practitioner may further generate 3D digital data (38). The 3D digital dental anatomy data 16 may be produced by, for example, forming and subsequently digitally scanning a physical impression or casting of the dental anatomy of patient 12. For example, a physical impression or casting of a dental arch of patient 12 may be scanned using a visible light scanner, such as an OM-3R scanner (available from Laser Design, Inc. of Minneapolis, Minn.) or an ATOS scanner (available from GOM GmbH of Braunschweig, Germany). Alternatively, the practitioner may generate the 3D digital dental anatomy data 16 of the occlusal service by use of an intra-oral scan of the dental arch of patient 12, or existing 3D tooth data. In one example, the method of forming a digital scan from a casting or an impression described in U.S. Pat. No. 8,491,306, titled, "REGISTER- ING PHYSICAL AND VIRTUAL TOOTH STRUCTURES WITH PEDESTALS," and issued on Jul. 23, 2013, which is incorporated herein by reference in its entirety, may be used. In the same or different examples, techniques for defining a virtual tooth surface and virtual tooth coordinate system as described in U.S. patent application Publication No. 2013/0325431, titled ORTHODONTIC DIGITAL SETUPS," and published on Dec. 5, 2013 may be used, which is incorporated herein by reference in its entirety. In any case, the digital data are digitally registered within the 3D modeling environment to form a composite digital representation of a dental anatomy, which may include the tooth roots as well as the occlusal surfaces.

In one example, 2D radiological images and the 3D digital data for the occlusal surface of the dental arch are registered by first attaching registration markers (e.g., fiducial markers or a pedestal having known geometry) to the dental anatomy of patient 12 prior to generating both the radiological images and the 3D digital scan. Thereafter, the digital representation of the registration markers within the 2D radiological image and the 3D digital data may be aligned within a 3D modeling environment using registration techniques described in U.S. Pat. No. 8,491,306.

In another example, 3D digital data of the dental anatomy is generated by combining two 3D digital representations of the dental anatomy. For example, a first 3D digital representation may be a relatively low-resolution image of the roots obtained from a CBCT scanner (e.g., an i-CAT 3D dental imaging device) and the second 3D digital representation may be a relatively high-resolution image of the crowns of the teeth obtained from an industrial CT scan of an impression or a visible light (e.g., laser) scan of a casting of the dental arch of the patient. The 3D digital representations may be registered using a software program that enables the 3D representations to be manipulated within a computer environment (e.g., Geomagic Studio software (available from 3D Systems, Inc.; 333 Three D Systems Circle, Rock Hill, S.C.), or alternatively, registration techniques described in U.S. Pat. No. 8,491,306 may be used.

Next, a computer system executing 3D modeling software renders a resultant digital representation of the dental anatomy, including the occlusal surface as well as the root structure of the patient's dental arch. Modeling software provides a user interface that allows the practitioner to manipulate digital representations of the teeth in 3D space relative to the digital representation of the patient's dental arch. By interacting with the computer system, the practitioner generates treatment information, such as by selecting indications of the final positions of individual teeth of patient 12, duration of a respective stage of treatment, or number of treatment stages, the direction or magnitude of forces on the teeth of patient 12 during a stage of treatment, or the like (40). For example, the final positions of individual teeth of patient 12, duration of a respective stage of treatment, or number of treatment stages may affect the direction or magnitude of forces on the teeth of patient 12 at each stage of treatment by each removable dental appliance of the set of removable dental appliances 22. In some examples, jumpers may be used during at least one, but fewer than all stages of treatment. As discussed above, the forces applied by each removable dental appliance (e.g., removable dental appliance 100 of FIG. 1) of the set of removable dental appliances 22 may be determined by selecting the dimensions, shapes, and positions of the at least one jumper (e.g., jumpers 108 and 110) and shells (e.g., shells 104). In this way, updating the database with diagnostic and treatment information (40) may include determining or selecting by the practitioner the dimensions, shapes, and positions of the at least one jumper and shells of each of removable dental appliance of the set of removable dental appliances 22 to result in the desired movement of the teeth of patient 12.

Once the practitioner has finished conveying general information regarding a diagnosis and treatment plan within the 3D environment, the computer system updates the database associated with the patient record to record the prescription data 18 conveying general information regarding a diagnosis and treatment plan as specified by the practitioner (42). Thereafter, the prescription data 18 is relayed to manufacturing facility 20 for manufacturing facility 20 to construct one or more removable dental appliances including jumpers, such as removable dental appliances 22 (44).

Although described with respect to an orthodontic practitioner located at an orthodontic clinic, one or more of the steps discussed with respect to FIG. 3 may be performed by a remote user, such as a user located at manufacturing facility 20. For example, the orthodontic practitioner may only send radiological image data and an impression or casting of the patient to manufacturing facility 20, where a user interacts with a computer system to develop a treatment plan within a 3D modeling environment. Optionally, a digital representation of the treatment plan within the 3D modeling environment may then be transmitted to the orthodontic practitioner of clinic 14, who may review the treatment plan and either send back his or her approval, or indicate desired changes.

Figure 4:
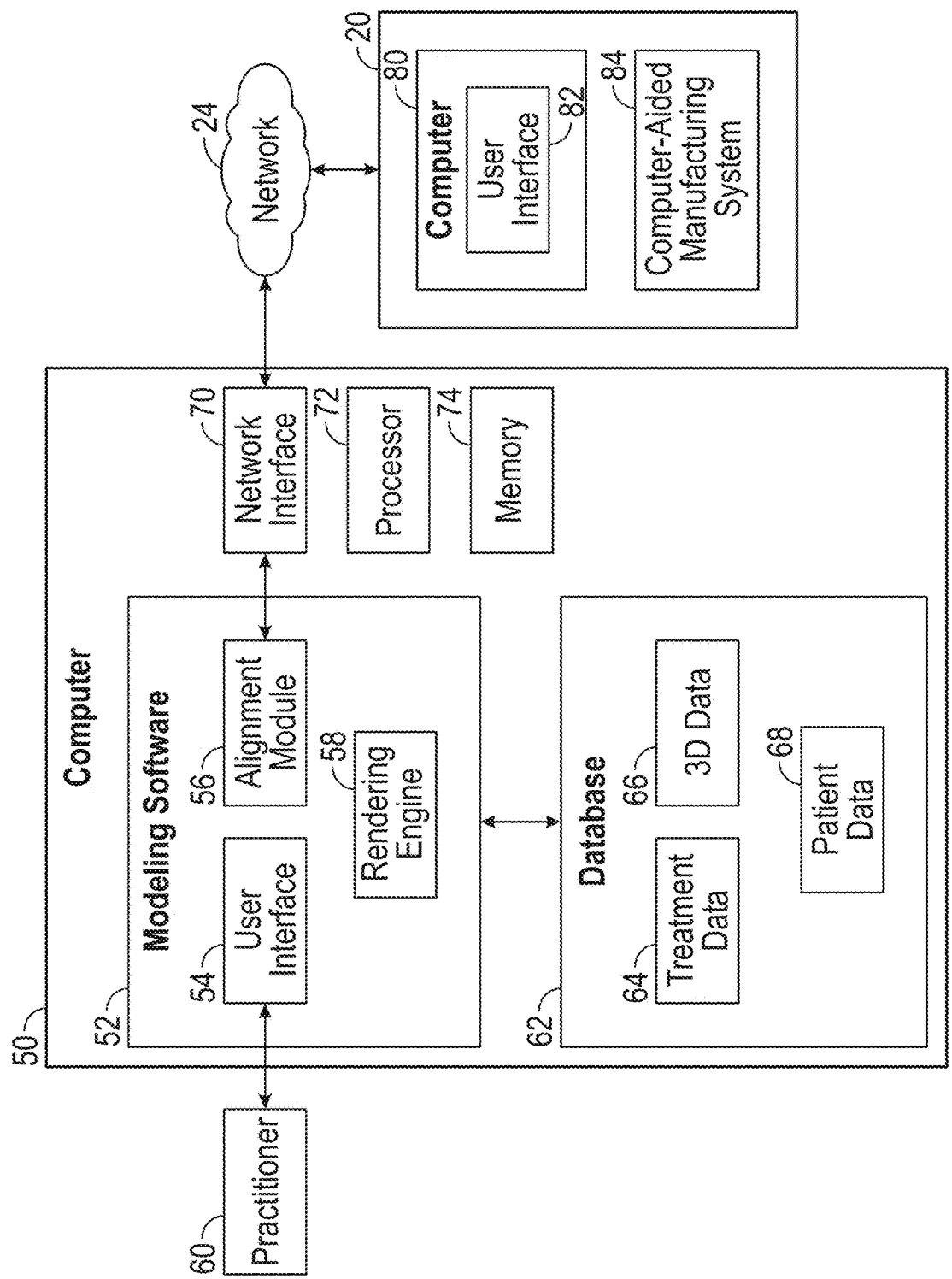
FIG. 4 is a block diagram illustrating an example of a client computer connected to a manufacturing facility via a network to generate digital dental anatomy data.

FIG. 4 is a block diagram illustrating an example of a client computer 50 connected to manufacturing facility 20 via network 24. In the illustrated example, client computer 50 provides an operating environment for modeling software 52. Modeling software 52 presents a modeling environment for modeling and depicting the 3D representation of the teeth of patient 12. In the illustrated example, modeling software 52 includes user interface 54, alignment module 56, and rendering engine 58.

User interface 54 provides a graphical user interface (GUI) that visually displays the 3D representation of patient's 12 teeth. In addition, user interface 54 provides an interface for receiving input from practitioner 60 of clinic 14, e.g., via a keyboard and a pointing device, a touchscreen, or the like, for manipulating patient's 12 teeth within the modeled dental arch.

Modeling software 52 may be accessible to manufacturing facility 20 via network interface 70. Modeling software 52 interacts with database 62 to access a variety of data, such as treatment data 64, 3D data 66 relating to the dental anatomy of patient 12, and patient data 68. Database 62 may be represented in a variety of forms including data storage files, lookup tables, or a database management system (DBMS) executing on one or more database servers. The database management system may be a relational (RDBMS), hierarchical (HDBMS), multi-dimensional (MDBMS), object oriented (ODBMS or OODBMS) or object relational (ORDBMS) database management system. The data may, for example, be stored within a single relational database, such as SQL Server from Microsoft Corporation. Although illustrated as local to client computer 50, database 62 may be located remote from the client computer 50 and coupled to the client computer 50 via a public or private network, e.g., network 24.

Treatment data 64 describes diagnosis or repositioning information for the teeth of patient 12 selected by practitioner 60 and positioned within the 3D modeling environment. For example, treatment data 64 may include the dimensions, shapes, and positions of the at least one jumper (e.g., jumpers 108 and 110 of FIG. 1) and shells (e.g., shells 104) that may result in a selected magnitude and direction of force vectors to be applied to each tooth (e.g., each of teeth 103) throughout the treatment plans.

Patient data 68 describes a set of one or more patients, e.g., patient 12, associated with practitioner 60. For example, patient data 68 specifies general information, such as a name, birth date, and a dental history, for each patient 12.

Rendering engine 58 accesses and renders 3D data 66 to generate the 3D view presented to practitioner 60 by user interface 54. More specifically, 3D data 66 includes information defining the 3D objects that represent each tooth (optionally including roots), and jaw bone within the 3D environment. Rendering engine 58 processes each object to render a 3D triangular mesh based on viewing perspective of practitioner 60 within the 3D environment. User interface 54 displays the rendered 3D triangular mesh to practitioner 60, and allows practitioner 60 to change viewing perspectives and manipulate objects within the 3D environment.

U.S. Pat. No. 8,194,067, titled, "PLANAR GUIDES TO VISUALLY AID ORTHODONTIC APPLIANCE PLACEMENT WITHIN A THREE-DIMENSIONAL (3D) ENVIRONMENT," issued on Jun. 5, 2012, and U.S. Pat. No. 7,731,495, titled, "USER INTERFACE HAVING CROSS SECTION CONTROL TOOL FOR DIGITAL ORTHODONTICS," issued on Jun. 8, 2010, describe other examples for computer systems and 3D modeling software having user interfaces that may be used with the techniques described herein, each of which are incorporated by reference in their entireties.

Client computer 50 includes processor 72 and memory 74 in order to store and execute modeling software 52. Memory 74 may represent any volatile or non-volatile storage elements. Examples include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include non-volatile storage, such as a hard-disk, magnetic tape, a magnetic or optical data storage media, a compact disk (CD), a digital versatile disk (DVD), a Blu-ray disk, and a holographic data storage media.

Processor 72 represents one or more processors such as a general-purpose microprocessor, a specially designed processor, an application specific integrated circuit (ASIC), a field programmable gate array (FPGA), a collection of discrete logic, or any type of processing device capable of executing the techniques described herein. In one example, memory 74 may store program instructions (e.g., software instructions) that are executed by processor 72 to carry out the techniques described herein. In other examples, the techniques may be executed by specifically programmed circuitry of processor 72. In these or other ways, processor 72 may be configured to execute the techniques described herein.

Client computer 50 is configured to send a digital representation of a 3D dental anatomy of a patient, and optionally, treatment data 64 and/or patient data 68 to computer 80 of manufacturing facility 20 via network 24. Computer 80 includes user interface 82. User interface 82 provides a GUI that visually displays the 3D representation of the digital model of teeth. In addition, user interface 82 provides an interface for receiving input from a user, e.g., via a keyboard and a pointing device, for manipulating a patient's teeth within the digital representation of the 3D dental anatomy of the patient.

Computer 80 may further be configured to automatically determine dimensions and shapes of set of removable dental appliances 22. The dimensions and shapes of removable dental appliance 22 may include a position, dimension, and shape of shells and the at least one jumper such that removable dental appliance 22 is configured to reposition the one or more teeth from their initial positions to final positions when the removable dental appliance is worn by the patient. As discussed above, the position, dimension, and shape of the shells and the at least one jumper may affect the magnitude, direction, and length of expression of a force applied to the teeth when the removable dental appliance is worn by the patient. For example, the length and shape of a respective jumper may determine, at least in part, the magnitude, direction, and length of expression of the force resulting from a deformation of the respective jumper when the removable dental appliance is worn by the patient. The locations where a respective jumper is coupled to a respective shell may also determine, at least in part, the direction of the force that may be transferred from a respective jumper to a respective shell. Also, the location or locations of engagement of a respective shell with a respective tooth determine the direction of the force applied to the respective tooth. Computer 80 may analyze at least one of the magnitude, direction, and length of expression of the force resulting from a deformation of the respective jumper when the removable dental appliance is worn by the patient to determine at least one of position, dimension, and shape of a respective shells and the at least one jumper that will result in a desired movement of the patient's teeth when the removable dental appliance is worn by the patient. Computer 80 may transmit, or otherwise send, a digital model of the set of removable dental appliance 22, the dimensions and shapes of the set of removable dental appliances 22, or both, to computer-aided manufacturing system 84 for production of the set of removable dental appliances 22.

For example, computer 80 may be configured to determine at least one of the dimensions and shapes. Computer 80 may present a representation of the removable dental appliance 22 for the user to review, including review of dimensions and shapes. Alternatively, or additionally, computer 80 may accept input from a user to determine dimensions and shapes of set of removable dental appliances 22 for patient 12. For example, the user input may influence at least one of an automatically determined dimensions or shapes.

Client computer 50 and computer 80 are merely conceptual representations of an example computer system. In some examples, the functionalities described with respect to client computer 50 and/or computer 80 may be combined into a single computing device or distributed among multiple computing devices within a computer system. For example, cloud computing may be used for digital design of dental appliances described herein. In one example, the digital representations of dental anatomy are received at one computer at the clinic, while a different computer, such as computer 80, is used to determine the shapes and dimensions of a removable dental appliance. In addition, it may not be necessary for that different computer, such as computer 80, to receive all of the same data in order for it to determine shapes and dimensions. Shapes and dimensions may be determined, at least in part, based on knowledge derived through analysis of historical cases or virtual models of exemplary cases, without receiving a complete 3D representation of the case in question. In such an example, data transmitted between client computer 50 and computer 80, or otherwise utilized to design a custom dental appliance may be significantly less than the complete data set representing a complete digital dental model of a patient.

Figure 5:
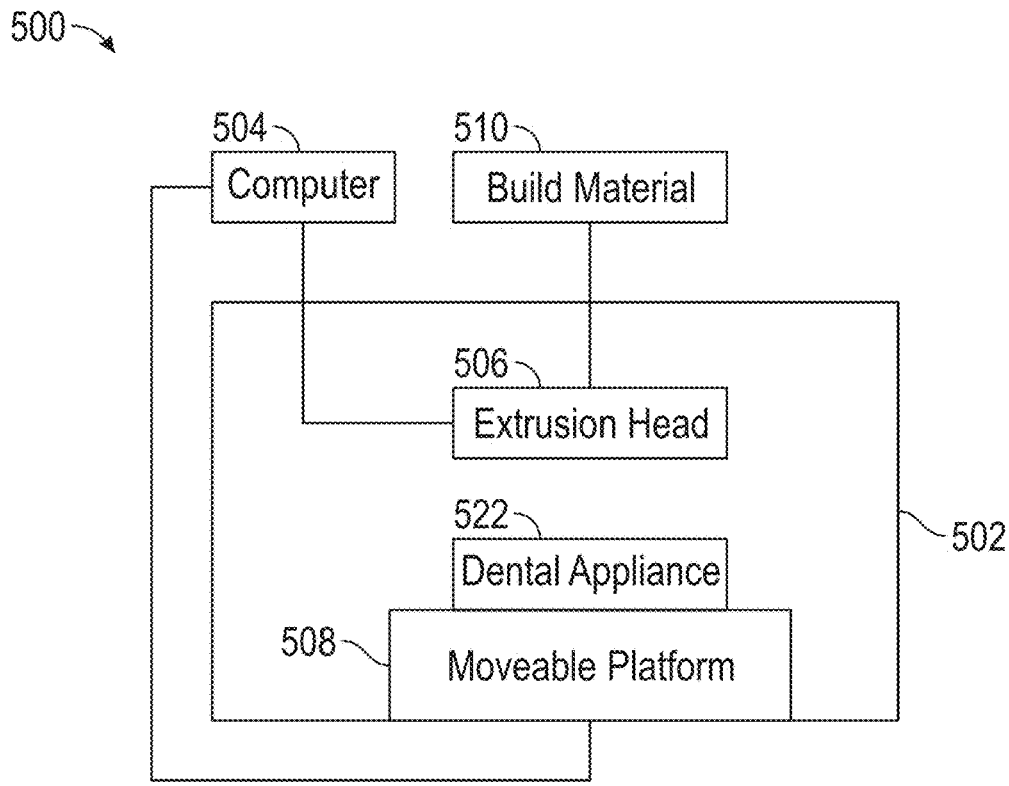
FIG. 5 is a block diagram illustrating an example computer-aided manufacturing system for construction of a removable dental appliance.

FIG. 5 is a block diagram illustrating an example computer-aided manufacturing system 500 for construction of removable dental appliance 522. Computer-aided manufacturing system 500 may include an additive manufacturing system 502 in communication with computer 504 and coupled to build material source 510. In some examples, computer-aided manufacturing system 500 may include computer-aided manufacturing system 84 of FIG. 4. Build material source 510 may include a source of at least one polymeric material, such as, for example, at least one of the polymeric materials of appliance body 102 discussed above. Dental appliance 522 may be the same as or substantially similar to removable dental appliance 100. In some examples, dental appliance 522 may include one dental appliance of a set of dental appliances 22.

Additive manufacturing system 502 may include a moveable platform 508 and an extrusion head 506. Movable platform 508 and extrusion head 506 may be configured to manufacture dental appliance 522. For example, computer 504 may control extrusion head 506 and moveable platform 508 to manufacture removable dental appliance 522. Controlling, by computer 504, extrusion head 506 may include at least one of controlling a material feed rate from build material source 510 to extrusion head 506, controlling a deposition rate of build material on dental appliance 522, controlling a temperature of extrusion head 506, and controlling a position of extrusion head 506. By controlling at least one of a material feed rate, a material deposition rate, a temperature of extrusion head 506, and a position of extrusion head 506, computer 504 may control manufacture of a position, dimension, and shape of at least a portion of dental appliance 522. Controlling, by computer 504, movable platform 508 may include at least one of controlling a translation of moveable platform in a plane normal to the direction of material deposition from extrusion head 506 and controlling an elevation of moveable platform along an axis substantially parallel to the direction of material deposition from extrusion head 506. By controlling at least one of a translation and elevation of moveable platform 508, computer 504 may control manufacture of a position, dimension, and shape of at least a portion of dental appliance 522.

Although FIG. 5 illustrates a computer-aided manufacturing system 500 configured for Fused Deposition Modeling (FDM), computer-aided manufacturing system 500 may also be configured for stereolithography (SLA), inverse vat polymerization additive manufacturing, or inkjet/polyjet additive manufacturing. In examples in which computer-aided manufacturing system 500 is configured for polyjet printing, computer-aided manufacturing system 500 may be configured to print multiple materials in a single print, thereby allowing a high modulus material for the rigid components of dental appliance 522, such as shells, and a low modulus or elastomeric material for the less rigid dental appliance 522, such as jumpers. Further, with polyjet additive manufacturing, the modulus may be varied selectively across the dental appliance 522, and a different modulus may be used for the jumpers than is used for the shells, for example. Similarly, a different modulus may be used for the anchoring posterior shells than is used for the anterior shell used to reposition individual teeth.

Figure 6:
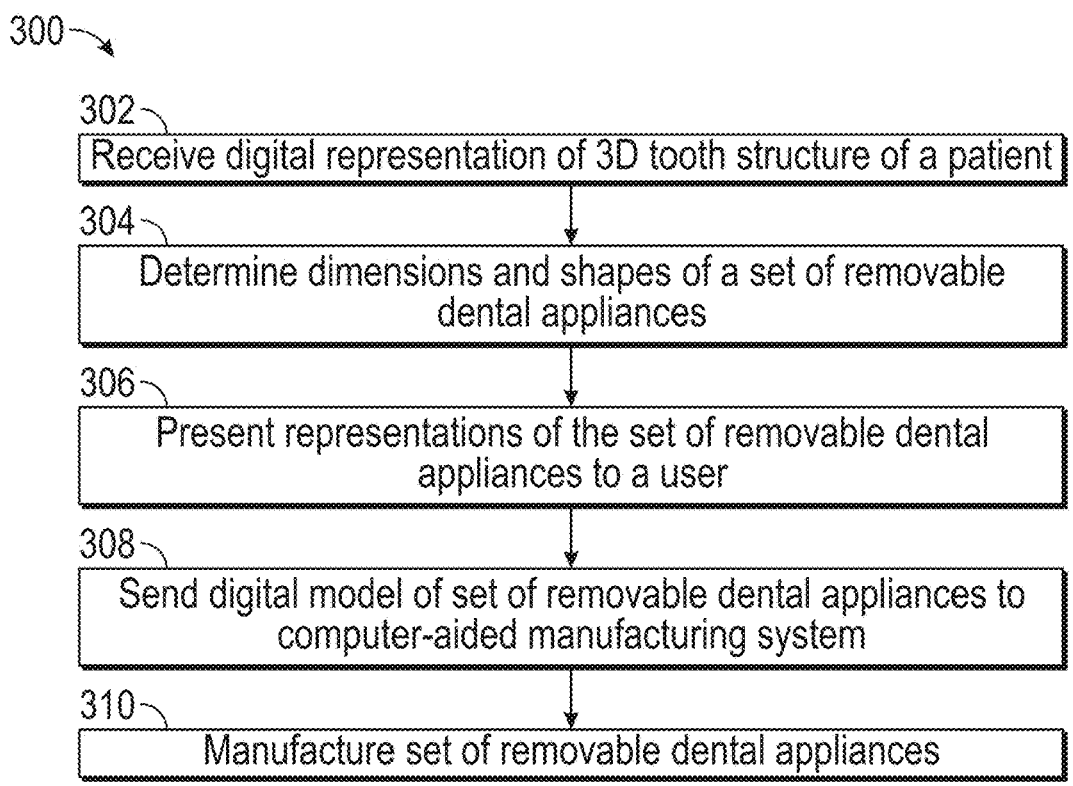
FIG. 6 is a flow diagram illustrating a process conducted at a manufacturing facility for construction of a set of removable dental appliances.

FIG. 6 is a flow diagram illustrating process 300 conducted at manufacturing facility 20 for construction of set of removable dental appliances 22. In some examples, set of removable dental appliances 22 may include one or more of removable dental appliance 100. Computer 80 at manufacturing facility 20 receives digital dental anatomy data 16 including initial positions of one or more teeth of the patient and prescription data 18 (302) from clinic 14. Alternatively, computer 80 may retrieve the information from a database located within or otherwise accessible by computer 80. A trained user associated with computer 80 may interact with a computerized modeling environment running on computer 80 to develop a treatment plan relative to the digital representation of the patient's dental anatomy and generate prescription data 18, if clinic 14 has not already done so. In other examples, computer 80 may automatically develop a treatment plan based solely on the patient's dental anatomy and predefined design constraints.

Once computer 80 receives patient's dental anatomy, computer 80 determines dimensions and shapes of a removable dental appliance for the patient (304). The dimensions and shapes of the removable dental appliance are configured to reposition the one or more teeth of the patient from their initial positions to final positions when the removable dental appliance is worn by the patient. In the same or additional examples, computer 80 determines dimensions and shapes of set of removable dental appliances 22 for the patient configured to be worn in series.

In some examples, determining dimensions and shapes of the removable dental appliance includes selecting, with computer 80, the dimensions and shapes of the removable dental appliance according to a set of predefined design constraints. The set of predesigned design constraints may include one or more factors, including, but not limited to, a minimum and a maximum localized force applied to one or more of the surrounded teeth, a minimum and a maximum rotational force applied to one or more of the surrounded teeth, a minimum and a maximum translational force applied to one or more of the surrounded teeth, a minimum and a maximum total force applied to one or more of the surrounded teeth, and a minimum and a maximum strain applied to the removable dental appliance, when the removable dental appliance is worn by the patient and the surrounded teeth are in their initial positions. Minimum applied forces are necessary to cause pressure on the periodontal ligament sufficient to result in bone remodeling and tooth movement.

Computer 80 may use finite element analysis (FEA) techniques to analyze forces on a patient's teeth as well as the removable dental appliance during the determination of the dimensions and shapes of the removable dental appliance. For example, computer 80 may apply FEA to a solid model of the patient's teeth as the modeled teeth move from their initial positions to their final positions representing a treatment including an ordered set of removable dental appliances. Computer 80 may use FEA to select the appropriate of the removable dental appliance to apply the desired forces on the teeth. In addition, computer 80 may use a virtual articulator to determine contact points between the teeth throughout the movement of the modeled teeth during the treatment. Computer 80 may further include occlusal contact forces, such as interdigitation forces, in the FEA forces analysis in combination with forces from the removable dental appliance during the design of removable dental appliances in an ordered set of removable dental appliances. Computer 80 may further determine an order in which teeth are to be moved to optimize the application of forces, reduce treatment time, improve patient comfort, or the like.

In some examples, determining dimensions and shapes of removable dental appliance 100 includes selecting, with computer 80 thicknesses of appliance body 102, such as shells 104 and jumpers 108 and 110, to provide a stiffness suitable to reposition the one or more teeth of the patient from their initial positions to final positions when removable dental appliance 100 is worn by the patient. In some examples, a thickness of a respective shell of shells 104 may range between about 0.2 millimeters and about 2.0 millimeters thick, such as between about 0.5 and about 1.0 millimeters thick, whereas a thickness of jumpers 108 and 110 may be between about 0.1 millimeters and about 1.0 millimeter, or about 0.3 millimeters and about 0.6 millimeters. In some examples, computer 80 may further select a material of the removable dental appliance, for example, a material as discussed above with respect to removable dental appliance 100, according to the predefined design constraints.

The dimensions and shapes of a removable dental appliance for the patient may be presented to a user via user interface of 82 of computer 80 (306). In examples in which dimensions and shapes of the removable dental appliance are presented to a user via user interface of 82, the user may have the opportunity to adjust the design constraints or directly adjust the dimensions and shapes of removable dental appliance 100 before the design data is sent to computer-aided manufacturing system 84. In some examples, the dimensions and shapes of removable dental appliance 100 may be presented to a user by computer 80 directly as removable dental appliance 100 is manufactured by computer-aided manufacturing system 84. For examples, computer 80 may send a digital model of removable dental appliance 100 to computer-aided manufacturing system 84, and computer-aided manufacturing system 84 manufactures removable dental appliance 100 according to the digital model from computer 80.

However, even in examples where the dimensions and shapes of a removable dental appliance for the patient may be presented to a user via user interface of 82 of computer 80, following user approval, computer 80 sends a digital model of the removable dental appliance to computer-aided manufacturing system 84 (308), and computer-aided manufacturing system 84 manufactures removable dental appliance 100 according to the digital model from computer 80 (310).

In some examples, computer-aided manufacturing system 84 may include a 3D printer. Forming appliance body 102 may include printing the surfaces of shells 104 and jumpers 108 and 110 with the 3D printer. In other examples, forming appliance body 102 may include printing representations of teeth 103 with the 3D printer, thermoforming appliance body 102 over the representations of teeth 103, and trimming excess material (optionally automated by CNC or robotic machinery such as, e.g., end mill or LASER cutter) to form shells 104 and jumpers 108 and 110. The representations of teeth 103 of the patient may include raised surfaces to facilitate forming the shells 104, jumpers 108 and 110, or both in the thermoformed and trimmed appliance body 102.

The techniques of FIG. 6 may be applied to design and manufacture of each of an ordered set of removable dental appliances 22. For example, each removable dental appliance in the ordered set of removable dental appliances 22 may be configured to incrementally reposition the teeth of the patient. In this manner, the ordered set of removable dental appliances 22 may be configured to reposition the teeth of the patient to a greater degree than any one of the removable dental appliances within the set of the removable dental appliances 22. Such an ordered set of removable dental appliances 22 may specifically be configured to incrementally reposition the one or more teeth of the patient from their initial positions to final positions as the removable dental appliances of the ordered set of removable dental appliances 22 for the patient are worn sequentially by the patient.

In some examples, the techniques described with respect to FIG. 6 may be embodied within a computer-readable storage medium, such as a computer-readable storage medium of computer 50, computer 80, or both. The computer-readable storage medium may store computer-executable instructions that, when executed, configure a processor to perform the techniques described with respect to FIG. 6.

Following the design of set of removable dental appliances 22, manufacturing facility 20 fabricates set of removable dental appliances 22 in accordance with the digital dental anatomy data 16 and prescription data 18 (310). Construction of removable dental appliances 22 may include 3D printing, thermoforming, injection molding, lost wax casting, 5-axis milling, laser cutting, hybrid plastic and metal manufacturing techniques, such as snap-fitting and overmolding, as well as other manufacturing techniques.

Figure 7:
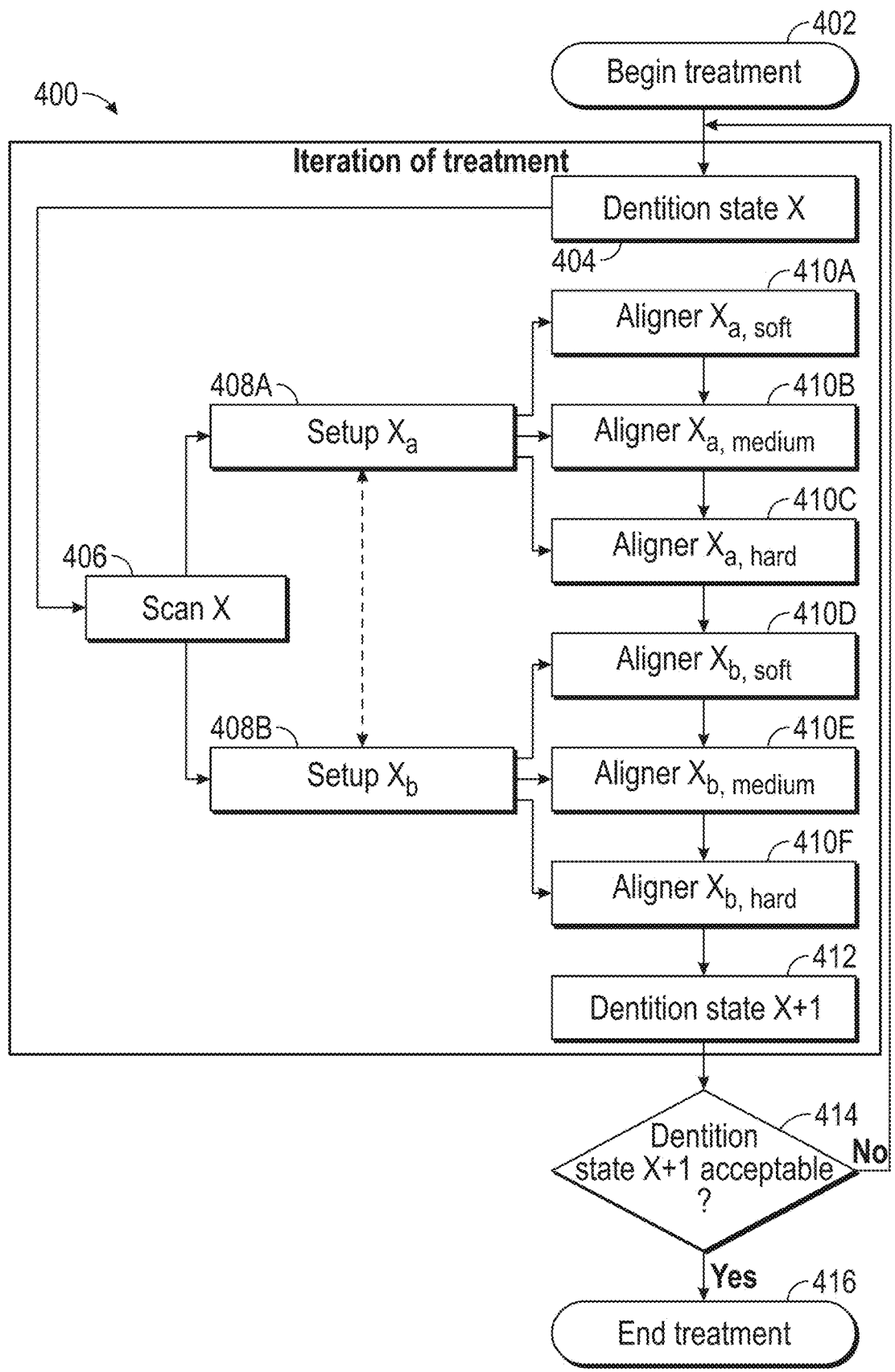
FIG. 7 is a flow diagram illustrating successive iterations of treatment using an ordered set of removable dental appliances.

FIG. 7 is a flow diagram 400 illustrating successive iterations of treatment using an ordered set of removable dental appliances. The ordered set of removable dental appliances is configured to reposition one or more teeth of a patient. In some examples, the ordered set of removable dental appliances may include one or more of removable dental appliance 100.

Treatment begins with the first iteration of treatment (402). At the beginning of the first iteration of treatment, the patient's teeth are at their initial positions as represented by detention state X (404). A scan of the patient's teeth, for example, as described above, are taken to facilitate the design of the ordered set of removable dental appliances (406). From the scan of patient's teeth, a computer, e.g., computer 50, determines two different shape and dimensions for removable dental appliances in the ordered set: first setup $X_a$ 408A and second setup $X_b$ 408B. Example techniques for creating a digital model of a patient's teeth are described in U.S. Pat. No. 8,738,165 to Cinader et al., titled, "METHODS OF PREPARING A VIRTUAL DENTITION MODEL AND FABRICATING A DENTAL RETAINER THEREFROM," and issued on May 27, 2014. U.S. Pat. No. 8,738,165 is herein incorporated by reference in its entirety. The computer may determine first setup $X_a$ 408A and second setup $X_b$ 408B by first adjusting the digital model of the patient's teeth to create a model of the desired position of the patient's teeth following the therapy. Then, the computer may create the shape and dimensions for removable dental appliances in the ordered set based on the time and forces required to move the patient's teeth from the initial positions to their desired positions. For example, the computer model may adjust the thicknesses, positions, shapes, and dimensions of shells and jumpers of the removable dental appliances in the ordered set to produce the forces required to move the patient's teeth from the initial positions to their desired positions. The modeled forces applied by removable dental appliances in the ordered set may further be based on the incremental positional movements of the patient's teeth during the treatment. In this manner, the computer may design each of the removable dental appliances in the ordered set according to expected forces applied on the teeth in the predicted positions of the teeth at the time during the treatment the removable dental appliances in the ordered set is to be worn by the patient.

In some examples, at least one, such as three, different removable dental appliances in the set of removable dental appliances can be manufactured using each of first setup $X_a$ 408A and second setup $X_b$ 408B to produce at least two, such as six, removable dental appliances in the set of removable dental appliances. For example, first setup $X_a$ 408A may be used to manufacture first removable dental appliance $X_{a,\ SOFT}$ 410A, second removable dental appliance $X_{a,\ MEDIUM}$ 410B, and third removable dental appliance $X_{a,\ HARD}$ 410C; and second setup $X_b$ 408B may be used to manufacture fourth removable dental appliance $X_{b,\ SOFT}$ 410D, fifth removable dental appliance $X_{b,\ MEDIUM}$ 410E, and sixth removable dental appliance $X_{b,\ HARD}$ 410F. First, second, and third removable dental appliances 410A to 410C may be substantially the same shape and dimensions, but may comprise materials with different stiffness characteristics. For example, the second and third removable dental appliances 410B and 410C may have higher stiffness characteristics than first removable dental appliance 410A, and third removable dental appliance 410C may have higher stiffness characteristics than second removable dental appliance 410B. Similarly, the fourth, fifth, and sixth removable dental appliances 410D to 410F may be substantially the same shape and dimensions, but comprise materials with different stiffness characteristics. In some examples, first removable dental appliance 410A may have the same stiffness characteristics as the fourth removable dental appliance 410D, such as a relatively soft polymeric material. Similarly, second removable dental appliance 410B may have the same stiffness characteristics as the fifth removable dental appliance 410E, such as a relatively stiffer polymeric material than first removable dental appliance 410A. Likewise, third removable dental appliance 410C may have the same stiffness characteristics as the sixth removable dental appliance 410F, such as a relatively stiffer polymeric material than second removable dental appliance 410B.

Removable dental appliances 410A to 410F in the ordered set of removable dental appliances may be worn in sequence over time by the patient. For example, each of removable dental appliances 410A to 410F in the ordered set of removable dental appliances may be worn between about 1 week and about 6 weeks, such as between about 2 weeks and about 4 weeks, or about 3 weeks. Following the treatment plan using removable dental appliances 410A to 410F, the patient's teeth may be at their final positions for the first iteration of treatment as represented by detention state X+1 (412).

Once patient's teeth are at or near dentition state X+1, the patient may return to the clinician who may evaluate the result of the first iteration of treatment (414). If the first iteration of treatment has resulted in acceptable final positions of the patient's teeth, then the treatment may be ended (416). However, if the first iteration of treatment did not result in acceptable final positions of the patient's teeth, one or more additional iterations of treatment may be performed. To begin the next iteration of treatment, the clinician may take another scan of the patient's teeth to facilitate the design of a subsequent ordered set of removable dental appliances (406). In some examples, evaluation of the result of the first iteration of treatment may include taking another scan of the patient's teeth, in which case beginning the next iteration of treatment may simply involve forwarding the digital model of the patient's teeth to a manufacturing facility so that another ordered set of removable dental appliances may be manufactured for the patient based on the new positions of the patient's teeth. In yet other examples, the newly acquired scan may be used to create one or more iterations of removable dental appliances in the clinician's facility.

The techniques of FIG. 7 represent one specific example, and a variety of modifications may be made to the techniques of FIG. 7 within the spirit of this disclosure. For example, an ordered set of removable dental appliances may include more or less than six removable dental appliances. As another example, each removable dental appliance in the ordered set of removable dental appliances may have unique shapes and dimensions, and each removable dental appliance in the ordered set of removable dental appliances may be made of material having substantially the same or similar stiffness characteristics. As another example, each removable dental appliance in the ordered set of removable dental appliances may include a selected dimension, shape, and position of the jumpers. For example, first removable dental appliance $X_{a,\ SOFT}$ 610A, second removable dental appliance $X_{a,\ MEDIUM}$ 610B, and third removable dental appliance $X_{a,\ HARD}$ 610C may be a first outer radius of curvature, length, cross-sectional shape, aspect ratio, or thickness of the jumpers; whereas fourth removable dental appliance $X_{b,\ SOFT}$ 610D, fifth removable dental appliance $X_{b,\ MEDIUM}$ 610E, and sixth removable dental appliance $X_{b,\ HARD}$ 610F may be a second, different outer radius of curvature, length, cross-sectional shape, aspect ratio, or thickness of the jumpers.

EXAMPLES

Example 1

Figure 8A:
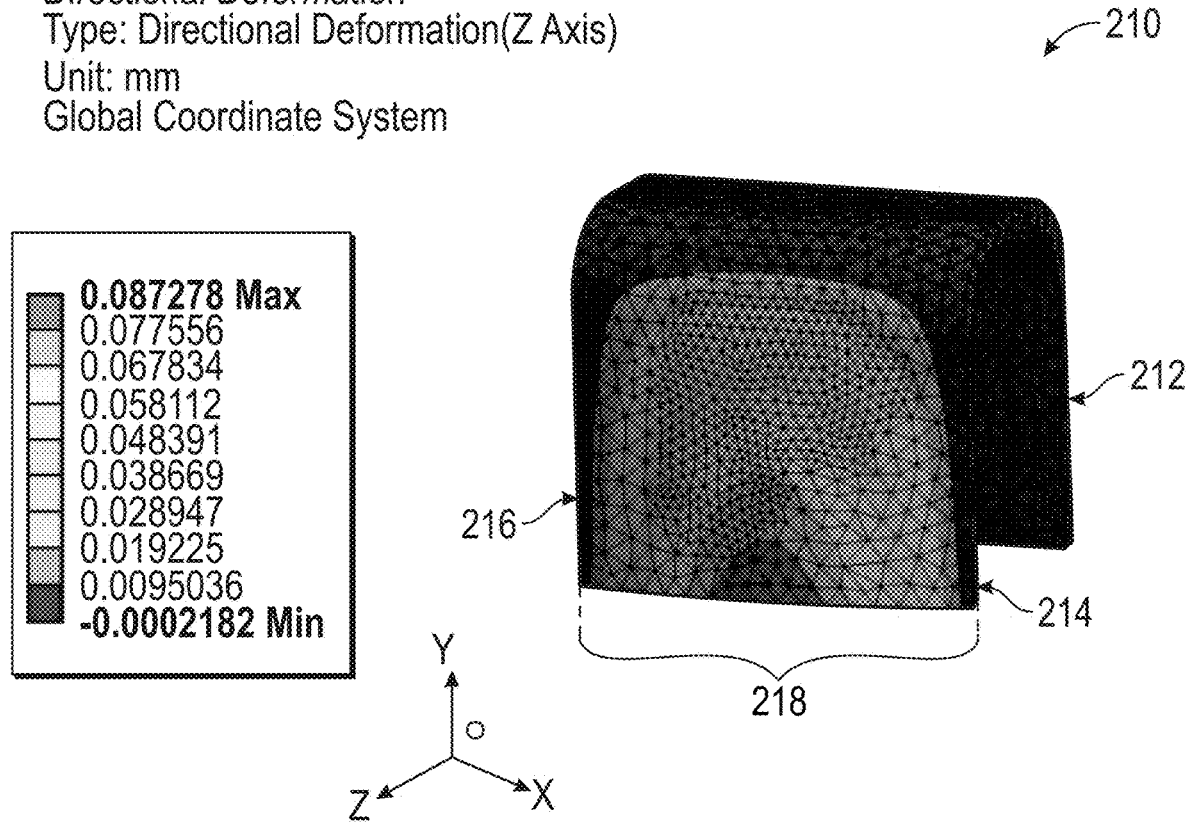
FIGS. 8A and 8B illustrate a directional deformation diagram and an equivalent stress diagram for a modeled removable dental appliance that does not include jumpers.
Figure 8B:
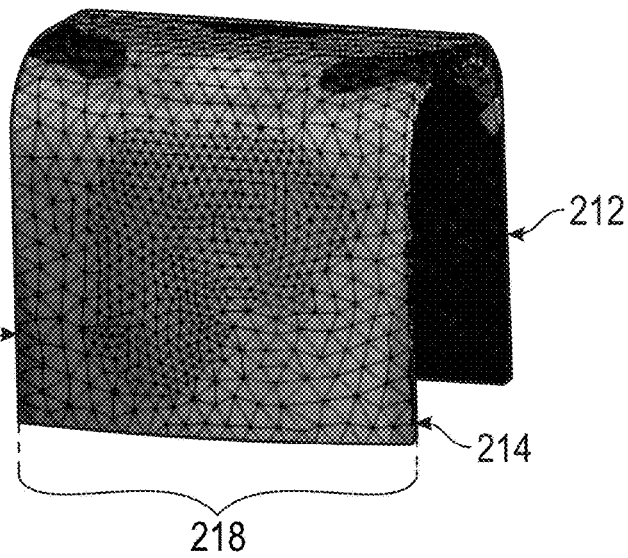

FIGS. 8A and 8B illustrate a directional deformation diagram 210 and an equivalent stress diagram 220 for a modeled shell of a removable dental appliance that does not include jumpers. FIGS. 8A and 8B show the lingual surface 212 and facial surface 214 of an example shell of a removable dental appliance without jumpers. For purposes of modeling, edge 216 of facial surface 214 was fixed along the x-axis, y-axis, and z-axis; the opposing edge of facial surface 214 was fixed along the z-axis; and both edges of the lingual surface were fixed along the z-axis. Deformation of the shell was modeled with a 2 Newton (204 gram) force applied to the center of the inside facial surface 214 in the facial direction. The shell material was modeled as DURAN, available from Scheu Dental, Iserlohn, Germany, with an elastic modulus of approximately 2200 MPa. The modeled removable dental appliance includes a nominal shell thickness of 0.50 millimeters. The maximum strain was 0.53%. As shown in FIG. 8A, deformation in the z-axis is distributed across face 218 of facial surface 214. As shown in FIG. 8B, stress is distributed across face 218 of facial surface 214. The example of FIGS. 8A and 8B show that without jumpers, stress and deformation of a removable dental appliance when worn by a patient is distributed across the shells of the removable dental appliance. As discussed above, distribution of deformation and stress in the shells may not be desirable because it may reduce engagement of the shells with the respective teeth, reducing control of the movement of the teeth.

Example 2

Figure 9A:
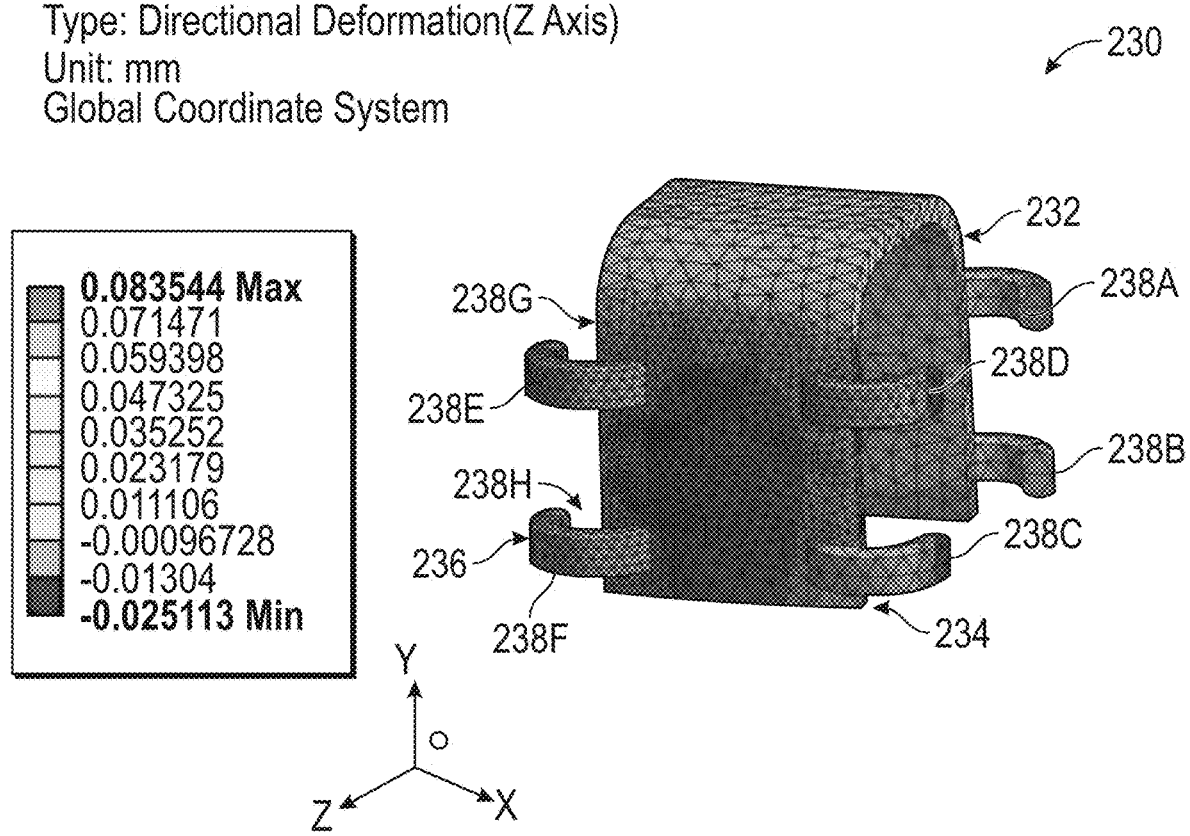
FIGS. 9A and 9B illustrate a directional deformation diagram and an equivalent stress diagram for a modeled removable dental appliance that includes jumpers.
Figure 9B:
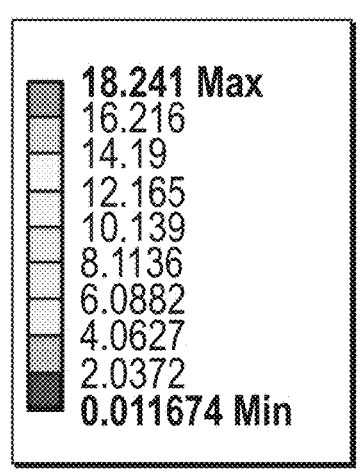
Figure 9B:
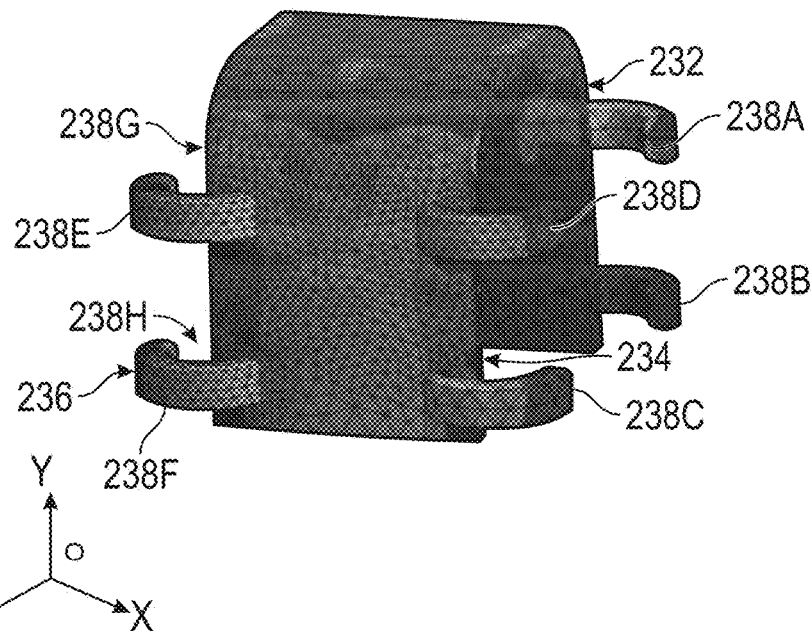

FIGS. 9A and 9B illustrate a directional deformation diagram and an equivalent stress diagram for a modeled shell of a removable dental appliance that includes at least one jumper 238A-238H. FIGS. 9A and 9B show the lingual surface 232 and facial surface 234 of an example shell of a removable dental appliance with jumpers 238A-238H (jumpers 238G and 238H not shown). For purposes of modeling, edge 236 of jumper 238F was fixed along the x-axis, y-axis, and z-axis; and the edges of the seven other jumpers were fixed along the z-axis. Deformation of the shell was modeled with a 2 Newton (204 gram) force applied to the center of the inside facial surface 234 in the facial direction. The shell material was modeled as DURAN, available from Scheu Dental, Iserlohn, Germany, with an elastic modulus of approximately 2200 MPa. The modeled removable dental appliance included a nominal shell thickness of 0.50 millimeters, jumper 238A-238H cross-section height of 1.0 millimeters and width of 0.6 millimeters. The maximum strain was 0.84%. As shown in FIG. 9A, deformation in the z-axis is concentrated in jumpers 238A-238H and reduced across the face of facial surface 214 compared to FIG. 8A. As shown in FIG. 9B, stress is concentrated in jumpers 238A-238H and is reduced across the face of facial surface 214 compared to FIG. 8B. The example of FIGS. 9A and 9B show that jumpers may reduce stress and deformation of the shell. As discussed above, reducing deformation in the shells is desirable because it may increase engagement of the shells with the respective teeth to improve control of the movement of the teeth.

Various examples have been described. These and other examples are within the scope of the following claims.

What is claimed is:

1. A removable dental appliance comprising:
an appliance body configured to at least partially surround a plurality of teeth of a dental arch of a patient, wherein the appliance body comprises:
a first shell shaped to receive a first tooth of the plurality of teeth;
a second shell shaped to receive a second tooth of the plurality of teeth
a third shell shaped to receive a third tooth of the plurality of teeth; and one or more jumpers, the one or more jumpers including at least a
first jumper comprising an elongated structure having a first end and a second end, wherein the first end of the first jumper is coupled to the first shell and the second end of the first jumper is coupled to the second shell, the first jumper spanning and extending away from an interproximal region between the first shell and the second shell, and
a second jumper comprising an elongated structure having a first end directly coupled to the elongated structure of the first jumper and a second end coupled to the third shell
wherein the first and second at least one jumpers are configured to apply a force between the shells to cause a movement of at least one of the first second, and third teeth toward a desired position when the removable dental appliance is worn by the patient,
wherein the elongated structure of first and second jumpers comprise an arcuate displacement in an outward facial or lingual direction from the surface of the body, and wherein the elongated structure of each of the first jumper and the second jumper comprise at least one of an arc, zig-zag, sinusoid, and spiral between the first end and the second end of the respective jumper.

2. The removable dental appliance of claim 1, wherein the appliance body increases in thickness by a chamfer or fillet near first and second ends of the first jumper.

3. The removable dental appliance of claim 1, wherein the first jumper defines a cross-section in a plane perpendicular to a longitudinal axis of the elongated structure of the first jumper, wherein the cross-section is at least one of symmetrical, anisotropic, and asymmetrical.

4. The removable dental appliance of claim 3, wherein the shape, area, or aspect ratio of the cross-section varies along the longitudinal axis.

5. The removable dental appliance of claim 1, wherein the first jumper is under a bending stress or a twisting stress when the removable dental appliance is worn by the patient.

6. The removable dental appliance of claim 1, wherein the first end of the first jumper is affixed to the first shell near a first axis of rotation or a first axis of translation of the first tooth, and wherein the second end of the first jumper is affixed to the second shell near a second axis of rotation or a second axis of translation of the second tooth.

7. The removable dental appliance of claim 1, wherein the appliance body comprises a unitary material.

8. The removable dental appliance of claim 1, wherein the first jumper is more flexible than the first and second shells to at least one of reduce deformation of the first and second shells when the removable dental appliance is worn by the patient, or concentrate stress in the first jumper when the removable dental appliance is worn by the patient.

9. The removable dental appliance of claim 1, wherein the one or more jumpers includes the first jumper, the second jumper, and a third jumper, the appliance body further comprises;
a fourth shell shaped to receive a fourth tooth of the plurality of teeth; and
the third jumper comprises an elongated structure having a first end and a second end, wherein the first end of the third jumper is coupled to the fourth shell and the second end of the third jumper is coupled to the second jumper,
wherein the third jumper is configured to apply a force between the first jumper and second jumper to cause cascading force to result in a movement of at least one of the first, second, third, and fourth teeth toward a desired position when the removable dental appliance is worn by the patient.

10. The system of claim 1, wherein the first and second shells comprise a polymeric material, and wherein the first jumper comprises at least one metal wire.

11. A system comprising:
an ordered set of removable dental appliances configured to reposition one or more teeth of a patient, each removable dental appliance in the set of removable dental appliances comprising an appliance body configured to at least partially surround a plurality of teeth of a dental arch of a patient, wherein the appliance body comprises:
a first shell shaped to receive a first tooth of the plurality of teeth;
a second shell shaped to receive a second tooth of the plurality of teeth;
a third shell shaped to receive a third tooth of the plurality of teeth; and one or more jumpers including at least a
first jumper comprising an elongated structure having a first end and a second end, wherein the first end of the first jumper is coupled to the first shell and the second end of the first jumper is coupled to the second shell, the first jumper spanning and extending away from an interproximal region between the first shell and the second shell, and a second jumper comprising an elongated structure having a first end directly coupled to and terminating on the elongated structure of the first jumper and a second end coupled to the third shell,
wherein the first and second jumpers are configured to apply a force between the shells to cause a movement of at least one of the first second, and third teeth toward a desired position when the removable dental appliance is worn by the patient, wherein the elongated structure of the first and second jumpers comprise an arcuate displacement in an outward facial or lingual direction from the surface of the body, and wherein each of elongated structures of the first jumper and the second jumper comprise at least one of an arc, zig-zag, sinusoid, and spiral between the first end and the second end of the respective jumper.

12. The system of claim 11, wherein the appliance body increases in thickness by a chamfer or fillet near first and second ends of the first jumper.

13. The system of claim 11, wherein the first jumper defines a cross-section in a plane perpendicular to a longitudinal axis of the elongated structure of the jumper, wherein the cross-section is at least one of symmetrical, anisotropic, and asymmetrical.

14. The system of claim 13, wherein the shape, area, or aspect ratio of the cross-section varies along the longitudinal axis of the first jumper.

15. The system of claim 11, wherein the one or more jumpers includes the first jumper, the second jumper, and a third jumper, the appliance body further comprises;
- a fourth shell shaped to receive a fourth tooth of the plurality of teeth; and
- the third jumper comprises an elongated structure having a first end and a second end, wherein the first end of the third jumper is coupled to the fourth shell and the second end of the third jumper is coupled to the second jumper,
- wherein the third jumper is configured to apply a force between the first jumper and second jumper to cause cascading force to result in a movement of at least one of the first, second, third, and fourth teeth toward a desired position when the removable dental appliance is worn by the patient.

* * * * *

UNITED STATES PATENT AND TRADEMARK OFFICE
CERTIFICATE OF CORRECTION

| | |
|---|---|
| PATENT NO. | : 11,395,718 B2 |
| APPLICATION NO. | : 16/753677 |
| DATED | : July 26, 2022 |
| INVENTOR(S) | : Richard Edward Raby |

It is certified that error appears in the above-identified patent and that said Letters Patent is hereby corrected as shown below:

In the Claims

<u>Column 29</u>
Line 45, Claim 1, delete "at least one", before "jumpers are".
Line 47, Claim 1, insert --,-- after "first".

Signed and Sealed this
Third Day of January, 2023

Katherine Kelly Vidal
*Director of the United States Patent and Trademark Office*